US012735628B1

(12) United States Patent
Gross et al.

(10) Patent No.: US 12,735,628 B1
(45) Date of Patent: Sep. 15, 2026

(54) RAPID-DARKENING, WAVELENGTH-TUNABLE PHOTOCHROMIC COMPOSITIONS, SYSTEMS, AND METHODS

(71) Applicant: HRL Laboratories, LLC, Malibu, CA (US)

(72) Inventors: Adam Gross, Santa Monica, CA (US); Erik Crenshaw, Los Angeles, CA (US); Shirell Klein, Los Angeles, CA (US); Gregory Rutkowski, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 578 days.

(21) Appl. No.: 18/197,058

(22) Filed: May 13, 2023

Related U.S. Application Data

(60) Provisional application No. 63/390,634, filed on Jul. 20, 2022.

(51) Int. Cl.
*C09K 9/00* (2006.01)
*B82Y 20/00* (2011.01)
(Continued)

(52) U.S. Cl.
CPC .............. *C09K 9/00* (2013.01); *G02F 1/0121* (2013.01); *G02F 1/0126* (2013.01); *B82Y 20/00* (2013.01);
(Continued)

(58) Field of Classification Search
None
See application file for complete search history.

(56) References Cited

U.S. PATENT DOCUMENTS

2017/0009073 A1* 1/2017 Wen ........................ G02B 5/223
2017/0349824 A1* 12/2017 Kan ..................... C09K 11/883
(Continued)

FOREIGN PATENT DOCUMENTS

CN 113736447 A * 12/2021 ............. B82Y 30/00
WO 2020175245 A1 9/2020

OTHER PUBLICATIONS

English translation of CN-113736447-A Description. (Year: 2021).*
(Continued)

*Primary Examiner* — Anthony J Zimmer
*Assistant Examiner* — Zachary John Baum
(74) *Attorney, Agent, or Firm* — O'Connor & Company; Ryan P. O'Connor

(57) ABSTRACT

Rapid-darkening and wavelength-tunable photochromic compositions and systems are disclosed. Nanoparticles photochromically darken in response to incident light by photo-oxidizing a dopant to reversibly create an optically absorbing mid-gap electronic state. The wavelengths that trigger photochromic darkening as well as the absorbed wavelengths may be tuned by changing the nanoparticle composition, the nanoparticle size, and/or the dopant. The time for reversal of darkening may be tuned using hole-accepting ligands attached to the nanoparticles as well as hole-accepting molecules adjacent to the nanoparticles. Some variations provide a photochromic composition comprising: semiconductor nanoparticles that do not include ZnS, ZnSe, ZnTe, or ZnInS; transition-metal dopant particles; and organic ligands bonded to the semiconductor nanoparticles, wherein the organic ligands contain a carboxylate functional group, a thiol functional group, an amine functional group, or a combination thereof. In the disclosed systems, there is an on/off switch for the photochromic function. Many photochromic uses are described.

19 Claims, 9 Drawing Sheets

(51) Int. Cl.
*B82Y 40/00* (2011.01)
*G02F 1/01* (2006.01)

(52) U.S. Cl.
CPC .......... *B82Y 40/00* (2013.01); *G02F 2202/06* (2013.01); *G02F 2202/14* (2013.01); *G02F 2202/36* (2013.01)

(56) References Cited

U.S. PATENT DOCUMENTS

2019/0339239 A1 11/2019 Noh et al.
2022/0162085 A1 5/2022 Kobayashi et al.

OTHER PUBLICATIONS

Chu, T. L., et al. Cadmium zinc sulfide films and heterojunctions. J. Appl. Phys. 70, 2688-2693 (1991). (Year: 1991).*
Han et al., "Fast T-Type Photochromism of Colloidal Cu-Doped ZnS Nanocrystals", J. Am. Chem. Soc. 2021, 143, 2239-2249 with Supporting Information.
Sanada et al., "Origin of the Anomalous Temperature Dependence of the Photochromic Reaction of Cu-Doped ZnS Nanocrystals", J. Phys. Chem. Lett. 2021, 12, 8129-8133.
Ma et al., "Enhancement of Afterglow in ZnS:Cu, Co Water-Soluble Nanoparticles by Aging", J. Phys. Chem. C 2011, 115, 8940-8944.
Ding et al., "Efficiency of Hole Transfer from Photoexcited Quantum Dots to Covalently Linked Molecular Species", J. Am. Chem. Soc.2015, 137, 2021-2029.
Olshansky et al., "Hole Transfer from Photoexcited Quantum Dots: the Relationship between Driving Force and Rate", J. Am. Chem. Soc. 2015, 137, 15567-15575.
Jiang et al., "Aqueous synthesis of color tunable Cu doped Zn—In—S/ZnS nanoparticles in the whole visible region for cellular imaging", J. Mater. Chem. B, 2015,3, 2402-2410.
Joost et al., "Reversible Photodoping of TiO2 Nanoparticles for Photochromic Applications", Chem. Mater. 2018, 30, 8968-8974.
Wang et al., "Reversible Chemochromic MoO3 Nanoribbons through Zerovalent Metal Intercalation", ACS Nano 2015, 9(3), 3226-3233.
Peng et al., "Synthesis and photoluminescence of ZnS:Cu nanoparticles", Optical Materials, vol. 29, Issues 2-3, Nov. 2006, pp. 313-317.
Ito et al., "Photochromism of colloidal ZnO nanocrystal powders under ambient conditions", Photochemical & Photobiological Sciences (2022) 21:1781-1791.

* cited by examiner

RAPID-DARKENING, WAVELENGTH-TUNABLE PHOTOCHROMIC COMPOSITIONS, SYSTEMS, AND METHODS

PRIORITY DATA

This patent application is a non-provisional application claiming priority to U.S. Provisional Patent App. No. 63/390,634, filed on Jul. 20, 2022, which is hereby incorporated by reference herein.

FIELD OF THE INVENTION

The present invention generally relates to photochromic compositions, photochromic systems, and methods of making and using photochromic compositions and photochromic systems.

BACKGROUND OF THE INVENTION

Photochromism is a reversible photochemical transformation of a chemical species between two forms having different absorption spectra. During the photochemical transformation, there may be various changes in physicochemical properties, such as chemical structure, refractive index, dielectric constant, and oxidation/reduction state. These property changes can be applied to various photonic devices, such as photo-optical switch components.

There are many uses for photochromic materials, in which the materials are colored (or darkened) when irradiated with light of a specific wavelength, the color disappears when the irradiation stops, and the color change is repeated potentially many times. Photochromic materials may be utilized in lenses, windows, and sensors, for example. Photochromic materials can be useful for eyewear, such as sunglasses, to protect eyes while allowing visibility under irradiation from the sun or another light source.

Other possible applications of photochromic systems include, but are not limited to, optical neural networks using photochromic memory media, applications to three-dimensional and near-field optical memory media, chiroptical molecular switches, non-linear optical transformations of photochromic molecules, and liquid crystalline photochromic materials.

Conventionally, the reversal time for photochromic darkening is difficult to control and is generally too long (such as minutes) to be useful for many applications when the materials are used in the solid state. Existing photochromic materials are made from organic molecules that twist, or are made using nanoparticles that undergo a slow reduction. After darkening, both types of materials take a long time to return to the uncolored state, which impedes operator or sensor vision after the light is removed. There is a desire for photochromic materials and systems that enable fast photochromic darkening and reversal thereof.

Another shortcoming with conventional photochromic materials is that they are not active outside of the visible spectrum. The reason for this limitation is that existing photochromics depend on electronic transitions of organic molecules or a limited range of inorganics with UV bandgaps. There is a desire for photochromic materials and systems that enable a greater range of operable wavelengths, such as near infrared (NIR), mid-wave (MWIR), and long-wave infrared (LWIR) electromagnetic wavelengths. Infrared wavelengths are important for many types of sensors, such as sensors for autonomous vehicles, imaging devices, optical power meters, missile guidance, flame monitors, moisture analyzers, night-vision devices, rail safety, water intrusion, and many other commercial applications. No visible-through-LWIR, tunable, and rapidly responsive glare/optical protection system exists today without additional sensors and computation, which adds to complexity and response time.

Yet another limitation with conventional photochromic materials is that they cannot be reversibly turned on and off. Practically speaking, it would be desirable to be able to turn the photochromic function on or off, depending on the environmental conditions, maintenance requirements, user preference, or other factors. There is a desire for photochromic materials and systems that incorporate an on/off switch.

SUMMARY OF THE INVENTION

The present invention addresses the aforementioned needs in the art, as will now be summarized and then further described in detail below.

Some variations provide a photochromic composition comprising:

(a) semiconductor nanoparticles that have an average nanoparticle effective diameter from about 1 nanometer to about 20 nanometers, wherein the semiconductor nanoparticles do not include ZnS, ZnSe, ZnTe, or ZnInS;

(b) transition-metal dopant particles disposed on surfaces of the semiconductor nanoparticles and/or within the semiconductor nanoparticles, wherein the transition-metal dopant particles are capable of undergoing reversible oxidation and reduction; and (c) organic ligands bonded to the semiconductor nanoparticles, wherein the organic ligands contain a carboxylate functional group, a thiol functional group, an amine functional group, or a combination thereof.

In some embodiments, the semiconductor nanoparticles are selected from the group consisting of single-element nanoparticles, two-element nanoparticles, three-element nanoparticles, four-element nanoparticles, and combinations thereof.

Single-element nanoparticles may be selected from the group consisting of Si, Ge, and combinations thereof.

Two-element nanoparticles may be selected from the group consisting of CdS, CdSe, CdTe, PbS, PbSe, PbTe, InP, InAs, InSb, GaP, GaAs, $Ag_2S$, $Ag_2Se$, $Ag_2Te$, and combinations thereof.

Three-element nanoparticles may be selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, $Ag_{2x}Cd_{1-x}S$, $Ag_{2x}Cd_{1-x}Se$, $Ag_{2x}Cd_{1-x}Te$, $Ag_{2x}Pb_{1-x}S$, $Ag_{2x}Pb_{1-x}Se$, $Ag_{2x}Pb_{1-x}Te$, $Ag_{2x}Sn_{1-x}S$, $Ag_{2x}Sn_{1-x}Se$, $Ag_{2x}Sn_{1-x}Te$, and combinations thereof, wherein $0<x<1$.

Four-element nanoparticles may be selected from the group consisting of copper indium gallium selenide, copper zinc tin sulfide, and combinations thereof.

In some embodiments, the average nanoparticle effective diameter is from about 1 nanometer to about 5 nanometers.

In some embodiments, the transition-metal dopant particles are disposed on surfaces of the semiconductor nanoparticles. Alternatively, or additionally, the transition-metal dopant particles may be disposed within the semiconductor nanoparticles.

In some embodiments, the transition-metal dopant particles contain a transition metal selected from the group consisting of Cu, Fe, Ag, Eu, and combinations thereof.

In some embodiments, the organic ligands contain at least one carbon-carbon aromatic bond, at least one carbon-carbon double bond, or at least one carbon-carbon triple bond. In certain embodiments, there are 8 or less carbon atoms (on average) between a bond site and the first carbon atom with an aromatic bond, a double bond, or a triple bond in the direction away from the bond site, wherein the bond site is the site at which one of the organic ligands bonds to one of the semiconductor nanoparticles.

In certain embodiments, the organic ligands contain a carboxylate functional group, a thiol functional group, or a combination thereof.

When the organic ligands contain a carboxylate functional group, the organic ligands may be selected from the group consisting of 4-pentenoate, phenylacetate, 3-phenylpropionate, 4-phenylbutyrate, oleate, methacrylate, and combinations thereof, for example.

When the organic ligands contain a thiol functional group, the organic ligands may be selected from the group consisting of 2-propene-1-thiol, benzenethiol, and combinations thereof, for example.

When the organic ligands contain an amine functional group, the organic ligands may be selected from the group consisting of porphyrins, aniline, benzylamine, phenethylamine, phenylpropylamine, oleylamine, 2-aminoethanol, 3-aminopropanol, and combinations thereof, for example.

In some embodiments, the photochromic composition further comprises a matrix surrounding the semiconductor nanoparticles. The matrix may contain an organic polymer, an organic electrolyte, an inorganic oxide, or a combination thereof, for example. The inorganic oxide may be selected from the group consisting of $SiO_2$, ZnO, $Al_2O_3$, $ZrO_2$, and combinations thereof, for example.

In some embodiments, the photochromic composition is characterized in that solid-state reversible chromatism takes place on a time scale of about 20 seconds or less.

Other variations provide a photochromic system with an on/off switch, where the photochromic system comprises:

(i) a photochromic composition comprising: (a) semiconductor nanoparticles that have an average nanoparticle effective diameter from about 1 nanometer to about 20 nanometers, wherein the semiconductor nanoparticles do not include ZnS, ZnSe, ZnTe, or ZnInS; (b) transition-metal dopant particles disposed on surfaces of the semiconductor nanoparticles and/or within the semiconductor nanoparticles, wherein the transition-metal dopant particles are capable of undergoing reversible oxidation and reduction; and (c) organic ligands bonded to the semiconductor nanoparticles, wherein the organic ligands contain a carboxylate functional group, a thiol functional group, an amine functional group, or a combination thereof; and (ii) an on/off switch configured to reversibly activate the photochromic composition, wherein the on/off switch is disposed in electrical or electrochemical communication with the photochromic composition.

In some embodiments, the on/off switch is configured to apply an electric field to the semiconductor nanoparticles. The electric field may be provided by one or more electrodes disposed in electrical communication with the semiconductor nanoparticles. The one or more electrodes may include sheet electrodes, wire-grid electrodes, or a combination thereof. The one or more electrodes may include conducting metal oxide electrodes, conducting polymer electrodes, or a combination thereof, for example. The electric field may be configured to quench emissive electron-hole recombination.

In some embodiments, the on/off switch is configured to apply an electrochemical potential to the semiconductor nanoparticles. In some embodiments, the on/off switch is configured to electrochemically oxidize or reduce the transition-metal dopant particles. In some embodiments, the on/off switch is configured to optically oxidize or reduce the transition-metal dopant particles.

The photochromic system may be characterized in that solid-state reversible chromatism takes place on a time scale of about 20 seconds or less.

The photochromic system may be characterized in that when the photochromic system is in the off state, the photochromic system allows greater than 90% transmission of incident visible or infrared light with energy below a bandgap of the semiconductor nanoparticles.

Other variations provide a method of reversing photochromism of a photochromic composition, the method comprising:

(i) providing a photochromic composition comprising: (a) semiconductor nanoparticles that have an average nanoparticle effective diameter from about 1 nanometer to about 20 nanometers, wherein the semiconductor nanoparticles do not include ZnS, ZnSe, ZnTe, or ZnInS; (b) transition-metal dopant particles disposed on surfaces of the semiconductor nanoparticles and/or within the semiconductor nanoparticles, wherein the transition-metal dopant particles are capable of undergoing reversible oxidation and reduction; and (c) organic ligands bonded to the semiconductor nanoparticles, wherein the organic ligands contain a carboxylate functional group, a thiol functional group, an amine functional group, or a combination thereof;

(ii) photoexciting at least some of the semiconductor nanoparticles, thereby creating a plurality of photoexcited holes;

(iii) moving at least some of the plurality of photoexcited holes into an atomic orbital associated with the transition-metal dopant particles, thereby generating dopant-contained holes; and (iv) trapping at least some of the dopant-contained holes in the organic ligands and/or in a matrix surrounding the semiconductor nanoparticles, thereby reversing photochromism of the photochromic composition.

In some methods, the semiconductor nanoparticles are selected from the group consisting of single-element nanoparticles, two-element nanoparticles, three-element nanoparticles, four-element nanoparticles, and combinations thereof.

In some methods, the transition-metal dopant particles contain a transition metal selected from the group consisting of Cu, Fe, Ag, Eu, and combinations thereof.

In some methods, the organic ligands contain at least one carbon-carbon aromatic bond, at least one carbon-carbon double bond, or at least one carbon-carbon triple bond; and step (iv) traps at least some of the dopant-contained holes in the organic ligands.

In some methods, the matrix contains hole-trapping molecules, and step (iv) traps at least some of the dopant-contained holes in the matrix.

In some methods, reversing photochromism in step (iv) takes place on a time scale of about 20 seconds or less.

In some embodiments, the method further comprises reversibly activating the photochromic composition utilizing an on/off switch disposed in electrical or electrochemical communication with the photochromic composition. In some methods, the on/off switch applies an electric field to the semiconductor nanoparticles. In some methods, the on/off switch applies an electrochemical potential to the semiconductor nanoparticles. In some methods, the on/off switch electrochemically oxidizes or reduces the transition-metal dopant particles.

DETAILED DESCRIPTION OF EMBODIMENTS OF THE INVENTION

Figure 1:
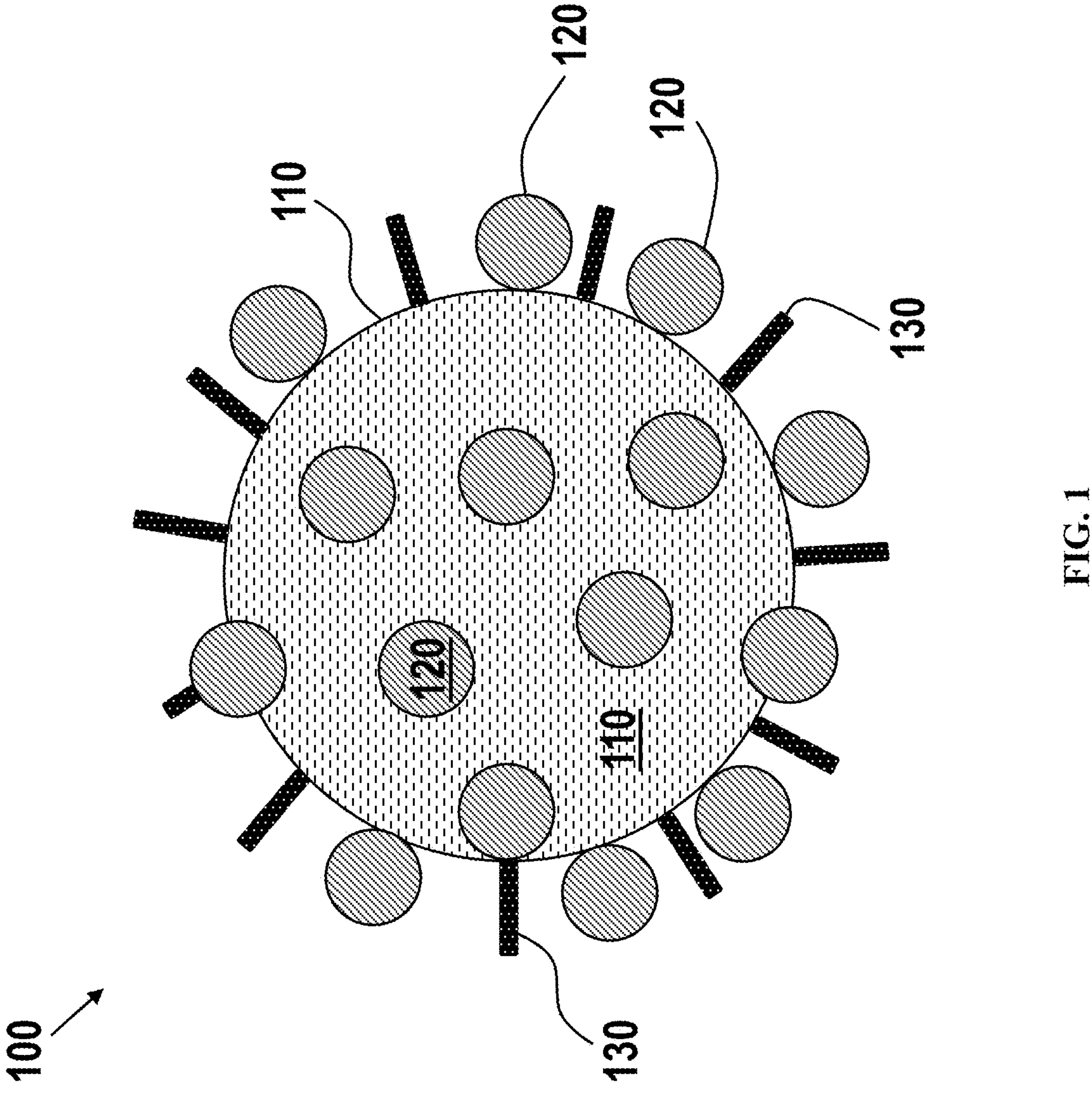
FIG. 1 depicts an exemplary photochromic composition, in various embodiments.

The principles, structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Intrusive light can block operator vision, can blind sensors for autonomous vehicles, and can damage photosensitive platforms. For continuous-wave laser light protection or incoherent light protection, no visible-through-LWIR, tunable, and rapidly responsive (<1000 milliseconds) glare/optical protection system exists today without additional sensors and computation.

Some variations of the invention are premised on nanoparticles that photochromically darken in response to incident light by photo-oxidizing a dopant to reversibly create an optically absorbing mid-gap electronic state. The wavelengths that trigger the photochromic darkening as well as the absorbed wavelengths from the mid-gap electronic state may be tuned by changing the nanoparticle composition, the nanoparticle size, and/or the dopant. The time scale for the reversal of darkening may be tuned using hole-accepting ligands that are attached to the nanoparticles as well as hole-accepting molecules that are adjacent to the nanoparticles. The reversal of darkening is not controlled by the amount of water, as in many conventional photochromic materials.

In some variations, the photochromic composition darkens when a photoexcited electron hops to an adjacent nanoparticle, followed by the exchange of a dopant electron with a photoexcited hole in the valence band. This movement of carriers may be $10^3$-$10^4$ times faster than existing photochromics. The fast electron and hole movements allow the material to respond before glare or incident light causes the driver or sensor to lose control of the vehicle, for example. The reversal of photochromism may be mediated using surface molecules, which allows control of the reversal time so that the material lightens again once blinding stops, thereby optimizing driver or sensor vision.

Conventional photochromics are not active outside of the visible spectrum because they depend on electronic transitions of organic molecules or inorganic materials having UV bandgaps. By contrast, the disclosed photochromic compositions, systems, and methods can become active in the NIR spectrum, the MWIR spectrum, and the LWIR spectrum, in addition to the visible spectrum. The reason for the expanded functionality into the IR range is that the photochromic compositions, systems, and methods utilize mid-gap electronic states and can include a greater range of materials than known photochromics.

Compared to conventional photochromics, the wavelengths that cause photochromism are more tunable in variations of this invention. The wavelengths that cause photochromism can be tuned using the nanoparticle composition and the nanoparticle size, for example.

Additionally, compared to conventional photochromics, the wavelengths that cause absorption of light once the photochromism is triggered are more tunable in variations of this invention. The light absorption may be caused by a mid-gap dopant state in a nanoparticle. The dopant moves the energy level of the state inside the gap. Consequently, the wavelengths that absorb light are adjusted by the dopant.

Conventional photochromics cannot be turned on and off. Because the disclosed photochromic system in some variations functions by moving electrons across the nanoparticle and placing a photoexcited hole in the dopant orbital, the carriers may be swept out of the material to stop the photochromic state. The carrier sweep may be accomplished with an electric field. By placing electrodes on a sheet containing the nanoparticles, an on/off function is enabled for the system. Additionally, an external electric field allows the use of traditionally emissive nanomaterials as photochromics, because the electric field is expected to quench emissive recombination.

Some variations provide a photochromic composition comprising or consisting essentially of:

(a) semiconductor nanoparticles that have an average nanoparticle effective diameter from about 1 nanometer to about 20 nanometers, wherein the semiconductor nanoparticles do not include ZnS, ZnSe, ZnTe, or ZnInS;

(b) transition-metal dopant particles disposed on surfaces of the semiconductor nanoparticles and/or within the semiconductor nanoparticles, wherein the transition-metal dopant particles are capable of undergoing reversible oxidation and reduction; and (c) organic ligands bonded to the semiconductor nanoparticles, wherein the organic ligands contain a carboxylate functional group, a thiol functional group, an amine functional group, or a combination thereof.

In some embodiments, the semiconductor nanoparticles are selected from the group consisting of single-element nanoparticles, two-element nanoparticles, three-element nanoparticles, four-element nanoparticles, and combinations thereof.

Single-element semiconductor nanoparticles may be selected from the group consisting of Si, Ge, and combinations thereof, for example. A combination of Si and Ge, when used as single-element nanoparticles, means that both Si nanoparticles and Ge nanoparticles are present and do not form any chemical bonds therebetween.

Two-element semiconductor nanoparticles may be selected from the group consisting of CdS, CdSe, CdTe, PbS, PbSe, PbTe, InP, InAs, InSb, GaP, GaAs, $Ag_2S$, and combinations thereof, for example. Combinations of two-element nanoparticles mean mixtures, not chemically bonded forms of different two-element nanoparticles, recognizing that a two-element nanoparticle itself contains chemical bonding between the elements. For example, Cd is bonded to S in cadmium sulfide, CdS; but a combination of CdS and InP does not have chemical bonding between CdS and InP in the case of solely two-element nanoparticles being used.

Three-element semiconductor nanoparticles may be selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, and combinations thereof, wherein $0<x<1$, for example. Combinations of three-element nanoparticles mean mixtures, not chemically bonded forms of different three-element nanoparticles, recognizing that a three-element nanoparticle itself contains chemical bonding between the elements.

Four-element semiconductor nanoparticles may be selected from the group consisting of copper indium gallium selenide, copper zinc tin sulfide, and combinations thereof, for example. Combinations of four-element nanoparticles mean mixtures, not chemically bonded forms of different four-element nanoparticles, recognizing that a four-element nanoparticle itself contains chemical bonding between the elements.

When the semiconductor nanoparticles contain a combination of specific nanoparticles having different numbers of elements, the combination may be a mixture, with no chemical bonding between the semiconductor nanoparticles. In other embodiments, the semiconductor nanoparticles contain specific nanoparticles having different numbers of elements, in which there is chemical bonding (e.g., ionic bonding, metallic bonding, or covalent bonding) or at least weak forces that may attract the nanoparticles to each other.

The semiconductor nanoparticles may be selected to have a bandgap from about 0.1 eV to about 5 eV, for example, measured at 25° C. and 1 bar. In various embodiments, the semiconductor nanoparticles are selected to have a bandgap of about, at least about, or at most about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 eV, including any intervening range, measured at 25° C. and 1 bar.

In some embodiments, the average nanoparticle effective diameter is from about 1 nanometer to about 5 nanometers. In various embodiments, the average nanoparticle effective diameter is about, at least about, or at most about 1 nm, 1.5 nm, 2 nm, 2.5 nm, 3 nm, 3.5 nm, 4 nm, 4.5 nm, 5 nm, 5.5 nm, 6 nm, 6.5 nm, 7 nm, 7.5 nm, 8 nm, 9 nm, 10 nm, 11 nm, 12 nm, 13 nm, 14 nm, 15 nm, 16 nm, 17 nm, 18 nm, 19 nm, or 20 nm, including any intervening range. The effective diameter of a nanoparticle is its diameter in the case of a sphere, a cylinder, a needle, or a rod. For other geometries, the effective diameter is $(61)^{1/3}$, where Vis the volume of a nanoparticle.

Particle sizes may be measured by a variety of techniques, including dynamic light scattering, laser diffraction, or image analysis, for example. Dynamic light scattering is a non-invasive, well-established technique for measuring the size and size distribution of particles typically in the submicron region, and with the latest technology down to 1 nanometer. Laser diffraction is a widely used particle-size measurement technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

The shape of the nanoparticles may vary. In some embodiments, the nanoparticles are spherical or approximately spherical. In various embodiments, the nanoparticles are spheres, rods, needles, platelets, cubes, pyramids, ovoids, randomly shaped objects, or a combination thereof.

Figure 2:
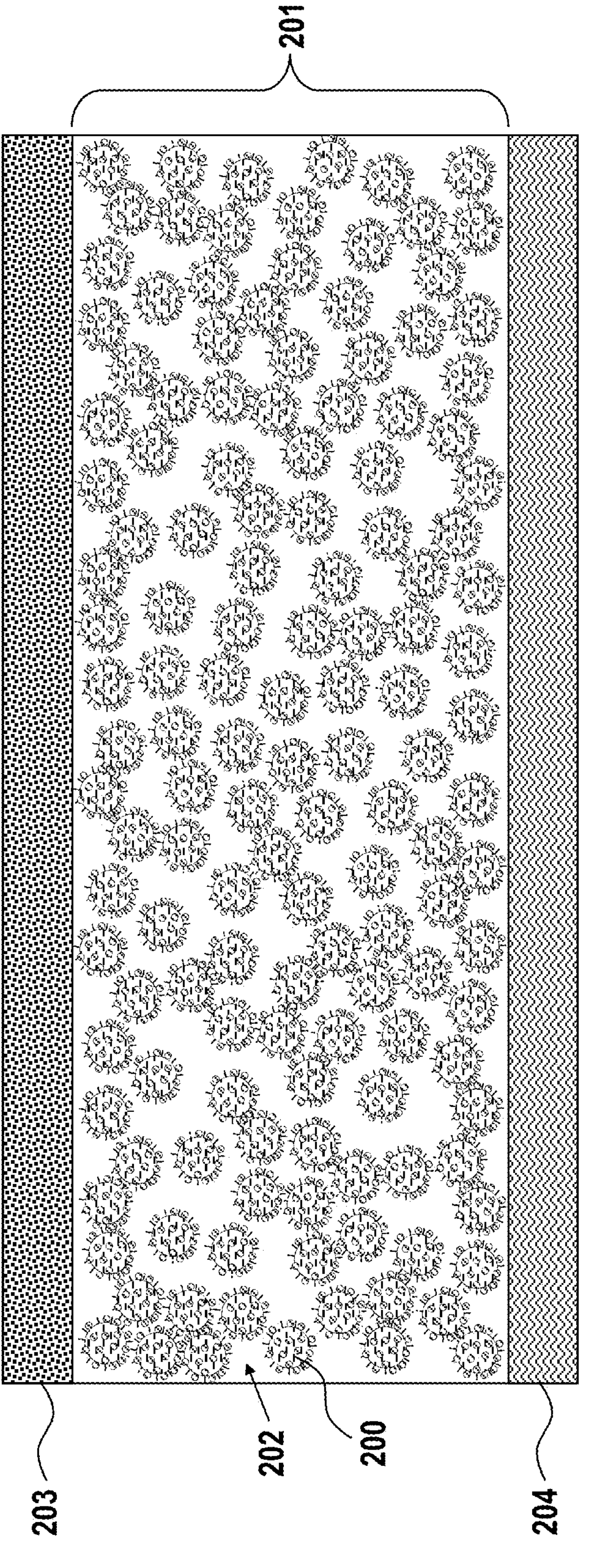
FIG. 2 depicts an exemplary photochromic system, in various embodiments.

The semiconductor nanoparticles are distinct semiconductor nanoparticles, as depicted in FIG. 2, not grains of a single piece of bulk polycrystalline semiconductor material. The analytical techniques recited above to measure nanoparticle size (e.g., dynamic light scattering) may be used to show that the photochromic composition contains distinct semiconductor nanoparticles rather than grains of a bulk material.

Another way to demonstrate the presence of distinct semiconductor nanoparticles is with a bandgap analysis. In a bulk polycrystalline semiconductor, the bandgap is fixed due to a continuous energy state. In individual semiconductor nanoparticles, the bandgap is size-dependent and can be altered to produce a range of energies between the valence band and conduction band. This is the quantum confinement effect. Semiconductor nanoparticles that are small enough to be governed by the quantum confinement effect are known as "quantum dots". Generally speaking, quantum confinement can be observed once the diameter of a semiconductor nanoparticle is of the same magnitude as the de Broglie wavelength of the electron wave function. When semiconductor nanoparticles are this small, their electronic and optical properties deviate substantially from the electronic and optical properties of bulk materials made from the same composition. The result is that the bandgap becomes size-dependent. As the size of the semiconductor decreases, the electrons and electron holes come closer in space, and the energy required to activate them increases. The bandgap of each individual semiconductor nanoparticle (quantum dot) is thus higher than the bandgap of the bulk semiconductor material of the same composition as the quantum dots.

The concentration of semiconductor nanoparticles within the photochromic composition may vary, such as from about 5 wt % to about 99.99 wt %, depending on the concentrations of dopant particles and organic ligands (see below) as well as the possible presence of a matrix described later. In some embodiments, the concentration of semiconductor nanoparticles within the photochromic composition is at least 90 wt %. In various embodiments, the concentration of semiconductor nanoparticles within the photochromic composition is about, at least about, or at most about 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 91 wt %, 92 wt %, 93 wt %, 94 wt %, 95 wt %, 96 wt %, 97 wt %, 98 wt %, 99 wt %, 99.5 wt %, 99.9 wt %, 99.95 wt %, or 99.99 wt %, including any intervening range (e.g., 65-99 wt %).

In some embodiments, the transition-metal dopant particles are disposed on surfaces of the semiconductor nanoparticles. Alternatively, or additionally, the transition-metal dopant particles may be disposed within the semiconductor nanoparticles (i.e., within the bulk phase of each of the nanoparticles). In certain embodiments, the transition-metal dopant particles are disposed (e.g., adsorbed) solely on surfaces of the semiconductor nanoparticles and are not disposed within the semiconductor nanoparticles. In other certain embodiments, the transition-metal dopant particles are disposed (e.g., absorbed or intercalated) solely within the semiconductor nanoparticles and not on surfaces thereof. In preferred embodiments, the transition-metal dopant particles are disposed both on surfaces of, and in a bulk phase of, the semiconductor nanoparticles.

The size of each transition-metal dopant particle is typically less than the average nanoparticle effective diameter. A transition-metal dopant particle may be as small as a volume defined by a single dopant atom, or as large as about one-half of the average nanoparticle effective diameter, for example, when a dopant particle contains a dopant phase with a plurality of dopant atoms. In various embodiments, the average effective diameter of the dopant particles is about, at least about, or at most about 0.1 nm, 0.2 nm, 0.3 nm, 0.4 nm, 0.5 nm, 0.6 nm, 0.7 nm, 0.8 nm, 0.9 nm, 1 nm, 2 nm, 3 nm, 4 nm, 5 nm, 6 nm, 7 nm, 8 nm, 9 nm, or 10 nm, including any intervening range.

The number of transition-metal dopant particles per semiconductor nanoparticle may vary widely, such as from 1 to $10^6$, preferably at least about 10, such as about, at least about, or at most about 10, $10^2$, $10^3$, $10^4$, $10^5$, or $10^6$, including any intervening range.

The concentration of transition-metal dopant particles within the photochromic composition may vary, such as from about 0.001 wt % to about 10 wt %, preferably from about 0.01 wt % to about 1 wt %. In various embodiments, the concentration of transition-metal dopant particles within the photochromic composition is about, at least about, or at most about 0.001 wt %, 0.005 wt %, 0.01 wt %, 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, or 1.0 wt %, including any intervening range. In some embodiments, the concentration of transition-metal dopant particles within the photochromic composition is less than about 5 wt %, 4 wt %, 3 wt %, 2 wt %, or 1 wt %.

The extent of doping may also be characterized by the mass ratio of transition-metal dopant particles to the semiconductor nanoparticles (the "dopant ratio"). The dopant ratio may be selected from about 0.0001 to about 0.1, for example. In various embodiments, the dopant ratio is selected as about, at least about, or at most about 0.0001, 0.0005, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, or 0.1, including any intervening range.

In some embodiments, the transition-metal dopant particles contain a transition metal selected from the group consisting of Cu, Fe, Ag, Eu, and combinations thereof. In certain embodiments, the transition-metal dopant particles contain a transition metal selected from the group consisting of Cu, Fe, Eu, and combinations thereof. Alternatively, or additionally, other transition metals may be used as dopants, such as Zn, Ni, Co, Mn, Cr, V, Ti, Sc, Cd, Pd, Rh, Ru, Tc, Mo, Nb, Zr, Y, Hg, Au, Pt, Ir, Os, Re, W, Ta, Hf, La, Lu, Yb, Tm, Er, Ho, Dy, Tb, Gd, Sm, Pm, Nd, Pr, Ce, and combinations thereof. The transition-metal dopant particles preferably are pure metal ions and not metal compounds such as halides, oxides, nitrides, sulfides, etc. For example, when the transition-metal dopant particles are copper, it is preferred that the dopant particles contain pure Cu(II) and not $CuCl_2$ or other copper halides. In the case of dopant particles, a "combination" of transition metals means that the elements remain atomic in nature in order to function as dopants. Thus for example a combination of Cu and Ag means there are separate Cu(II) and Ag(I) dopant particles, not intermetallic Cu—Ag compounds. While the dopant particles are preferably ions of pure metals, it will be recognized that impurities (including metal compounds) may be present in the transition-metal dopant particles, such that absolutely pure (100 wt %) Cu, Fe, Ag, or Eu is not strictly necessary.

In some embodiments, the transition-metal dopant particles are physically distinct from the semiconductor nanoparticles, as depicted in FIG. 1 showing dopant particles 120 and a single semiconductor nanoparticle 110. In some embodiments in which a common metal, such as silver, is contained both in semiconductor nanoparticles (e.g., $Ag_2S$) and in dopant particles (e.g., Ag), the dopant particles are physically different than the Ag content of the $Ag_2S$ nanoparticles. In this case, the Ag dopant atoms are not part of the orthorhombic crystals of the $Ag_2S$ nanoparticles. In other embodiments, transition-metal dopant atoms can replace metal atoms in a lattice. For example, in the case of ZnS semiconductor nanoparticles and Cu dopant particles, the Cu dopant atoms may replace Zn atoms in the ZnS lattice, in which case the Cu atoms are bonded within the lattice structure. When the Cu dopant particles are at the surface of the semiconductor nanoparticles, the Cu dopant particles can take the form of Cu ions (e.g., $Cu^{2+}$) that are ionically bonded to a terminal sulfur ion of ZnS, or the Cu ions can replace Zn atoms at the edge of the nanoparticle crystal, for example.

In some embodiments, the oxidation potential of the transition-metal dopant particles is less than the oxidation potential of the semiconductor nanoparticle anion. Also, in some embodiments, the reduction potential of the transition-metal dopant particles is less than the reduction potential of the semiconductor nanoparticle anion. Using these constraints, changing the dopant redox state does not change the oxidation state of the nanoparticle itself.

In some embodiments, the organic ligands include functional groups selected from carboxylates, thiols, amines, or a combination thereof. Organic ligands with carboxylates may be selected from the group consisting of 4-pentenoate, phenylacetate, 3-phenylpropionate, 4-phenylbutyrate, oleate, methacrylate, and combinations thereof, for example. Organic ligands with thiols may be selected from the group consisting of 2-propene-1-thiol (allyl mercaptan), benzenethiol (phenyl mercaptan), and combinations thereof, for example. Organic ligands with amines may be selected from the group consisting of porphyrins, aniline, benzylamine, phenethylamine, phenylpropylamine, oleylamine, 2-aminoethanol, 3-aminopropanol, and combinations thereof, for example.

Note that the chemical names of the above exemplary organic ligands may refer either to the ionic form or the neutral form. For example, 4-pentenoate is the ionic form, $CH_2{=}CHCH_2CH_2COO^-$, while benzenethiol ($C_6H_5SH$) and aniline ($C_6H_5NH_2$) are the neutral forms of the organic ligands. In typical embodiments, the organic ligands are bonded to the semiconductor nanoparticles via the functional groups, i.e., the functional groups themselves are bonded to the semiconductor nanoparticles.

There may be various types of bonds between organic ligands and semiconductor nanoparticles, including chemical bonds (e.g., ionic bonds, covalent bonds, or metallic bonds), which may also be referred to as chemisorption of organic ligands on semiconductor nanoparticles. Alternatively, or additionally, there may be physisorption of organic ligands on semiconductor nanoparticles. Physisorption may arise from the van der Waals force, a distance-dependent interaction between atoms or molecules. Unlike ionic or covalent bonds, van der Waals attractions do not result from a chemical electronic bond.

It is understood that benzenethiol may be actually bonded as $C_6H_5S^-$ (known as thiophenoxide or thiophenolate). Amines may associate with the surface using their lone-pair electrons at the N site of the amine group, in which the amine remains neutral. In some embodiments, amines are bonded to the surface in ionic form, such as aniline being bonded as $C_6H_5NH^-$ (anilinium). In the case of carboxylate functional groups, the organic ligands may be ionically bonded to the nanoparticles at the carboxylate functional groups. Thus, in the case of methacrylic acid as organic ligand and ZnS as nanoparticle, the organic ligand may formally be methacrylate, $CH_3CH_2COO^-$, in which a hydrogen atom has been removed, and the bond is $CH_3CH_2COO$—ZnS. Alternatively, $(CH_3CH_2COO)_2Zn$ may be formed, in which $Zn^{2+}$ forms by local removal of sulfur from ZnS, and there is no bonding directly with sulfur. Alternatively, or additionally, there may be $Zn^+$ at the surface of the nanoparticle, such that the Zn atom is only bonded to one S atom, not two S atoms as is found in the crystal. This will make an ionic bond with the carboxylate. Partial bonding may also occur, in which methacrylic acid remain in acid form, $CH_3CH_2COOH$, and forms a weak ionic bond with the surface of ZnS.

A "hole" refers to an electron hole which is a quasiparticle associated with the lack of an electron at a position where one could exist in an atom or atomic lattice. A "photoexcited hole" refers to a hole created by photoexcitation, which is excitation caused by one or more photons. In a normal atom or crystal lattice, the negative charge of electrons is balanced by the positive charge of atomic nuclei; the absence of an electron leaves a net positive charge at the hole's location.

In some embodiments, the organic ligands accept photoexcited holes from the dopant particles. The hole-accepting organic ligands may contain C═C aromatic bonds (bond order of 1.5), C═C double bonds (bond order of 2), C≡C triple bonds (bond order of 3), or a combination thereof, which may collectively be referred to as unsaturated carbon-carbon bonds (unsaturated bonds are not single C—C bonds). The hole-accepting organic ligands may contain aromatic rings, such as phenyl groups.

When hole-trapping unsaturated organic ligands are employed, the spacing between the nearest unsaturated carbon-carbon bonds and the nanoparticle surface controls the rate of hole acceptance. This spacing may be controlled according to the chain length between the bonding site of the functional group on the nanoparticle surface and the unsaturated carbon-carbon bonds. When unsaturated bonds are farther from the surface, the rate of hole transfer to the ligand is slower, and the photochromic decolorization time becomes longer compared to the rate of hole transfer when there is a shorter distance between the unsaturated bonds and the nanoparticle surface. In some embodiments, there are 8 or less carbon atoms between a bond site and the first unsaturated carbon atom—that is, a carbon atom with an aromatic bond, a double bond, or a triple bond—in the direction away from the bond site, on average. An average is used because there can be multiples types of organic ligands with varying chain lengths. The bond site is defined as the site at which an organic ligand bonds to a semiconductor nanoparticle. The average number of carbon atoms between a bond site and the first unsaturated carbon atom may be referred to as the "ligand hole-trap distance"—a parameter that chemically characterizes one or more organic ligands employed. The units of ligand hole-trap distance are number of carbon atoms, which formally is a dimensionless quantity. The actual molecular distance in angstroms may be calculated or simulated, it being understood that the true distance will depend on the exact molecular structure (including side chains). The actual distance in space will also depend on the dynamics of an organic ligand as it potentially moves around, e.g., twists or folds on itself to shorten the actual distance from the bond site to the first unsaturated bond.

In counting the number of carbon atoms for the ligand hole-trap distance, carbon atoms along the main chain are counted, including carbon contained in a main-chain carboxylate functional group, but ignoring carbon atoms in side chains. In this regard, the main chain is defined as the carbon chain that has the lowest number of carbon atoms until an unsaturated bond arises. Thus if an organic ligand has a long primary chain of 10 carbon atoms and a side group off the third carbon, where the side group starts with a double-bonded carbon atom, then the number of carbon atoms between the bond site and the first unsaturated carbon atom is 4; that chain becomes the main chain for purposes of calculating the ligand hole-trap distance.

The ligand hole-trap distance may be 7 carbon atoms, 6 carbon atoms, 5 carbon atoms, 4 carbon atoms, 3 carbon atoms, 2 carbon atoms, or 1 carbon atom. An example of an organic ligand with 8 or less carbon atoms between a bond site and the first carbon atom with an aromatic bond, a double bond, or a triple bond is 4-pentenoate, which has 4 carbon atoms between the bond site and the carbon atom that has a double bond (C═C). An example of an organic ligand with a ligand hole-trap distance of 1 carbon atom is benzenethiol, since the first carbon atom (attached to sulfur) is part of a benzene ring which means it is an aromatic carbon. An example of an organic ligand with a ligand hole-trap distance of 2 carbon atom is benzylamine, since the first carbon atom (attached to nitrogen) is in a single C—C bond, and the second carbon atom, in the direction away from the bond site, is part of a benzene ring which means it is an aromatic carbon.

In some embodiments, the organic ligands contain 16 or fewer carbon atoms. In certain embodiments, the organic ligands contain 12 or fewer carbon atoms. In various embodiments, the organic ligands contain 24, 23, 22, 21, 20, 19, 18, 17, 16, 15, 14, 13, 12, 11, 10, 9, 8, 7, 6, 5, 4, 3, 2, or 1 carbon atoms. When there are multiple types of organic ligands, an average carbon number is calculated, weighted by the relative weight fraction of each organic ligand relative to all organic ligands present. The average number of carbon atoms may be 16 or less, such as 12 or less.

The number of organic ligands per semiconductor nanoparticle may vary widely, such as from 1 to 1000, e.g. about, at least about, or at most about 1, 2, 3, 4, 5, 6, 7, 8, 9, 10, 50, 100, 200, 300, 400, 500, 600, 700, 800, 900, or 1000, including any intervening range. In a given photochromic composition, the total number of organic ligands bonded to semiconductor nanoparticle, divided by the total number of semiconductor nanoparticles, gives the number of organic ligands per semiconductor nanoparticle.

The concentration of organic ligands within the photochromic composition may vary, such as from about 0.01 wt % to about 50 wt %. In various embodiments, the concentration of organic ligands within the photochromic composition is about, at least about, or at most about 0.01 wt %, 0.1 wt %, 0.2 wt %, 0.3 wt %, 0.4 wt %, 0.5 wt %, 1 wt %, 2 wt %, 3 wt %, 4 wt %, 5 wt %, 6 wt %, 7 wt %, 8 wt %, 9 wt %, 10 wt %, 15 wt %, 20 wt %, 25 wt %, 30 wt %, 35 wt %, 40%, 45 wt %, or 50 wt %, including any intervening range.

In preferred embodiments, the organic ligands are fully bonded to the semiconductor nanoparticles. It is possible for there to be some free organic material containing an organic ligand that is not bonded to the semiconductor nanoparticles. For example, in the case of 4-pentenoate ($CH_2$═$CHCH_2CH_2COO^-$) as the organic ligand, usually bonded as $CH_2$═$CHCH_2CH_2COO$-NP where NP is nanoparticle, there may be free 4-pentenoic acid ($CH_2$═$CHCH_2CH_2COOH$) present in the photochromic composition. It is also possible for there to be some organic ligands bonded to dopant particles. For example, in the case of copper as dopant particles and 4-pentenoate as organic ligand, there may be some dynamic bonding to form $CH_2$═$CHCH_2CH_2COO$—Cu or $CH_2$═$CHCH_2CH_2COO$—Cu—$OOCCH_2CH_2CH$═$CH_2$, for example. In various embodiments, any organic ligands present in the photochromic composition are at least 90 wt %, preferably at least 95 wt %, more preferably at least 99 wt %, and most preferably at least 99.9 wt % (e.g., 100 wt %) bonded to the semiconductor nanoparticles.

The photochromic composition may contain other components besides the semiconductor nanoparticles, the dopant particles, and the organic ligands. For example, the photochromic composition may contain a redox agent that drives the oxidation and reduction of the dopant particles. In principle, the redox agent may be chemical, electrochemical, optical, or a combination thereof. Exemplary redox agents include, but are not limited to, oxygen, ozone, inorganic acids (e.g., nitric acid), organic acids (e.g., formic acid), halogens (e.g., $Cl_2$), halogen-containing compounds (e.g., NaClO), permanganate compounds (e.g., $KMnO_4$), perborates (e.g., $NaH_2BO_4$), peroxides (e.g., $H_2O_2$), nitrogen-containing compounds (e.g., $N_2O_4$ or $KNO_3$), metal oxides (e.g., $PbO_2$), hydides (e.g., $LiAlH_4$), thiosulfates (e.g., $Na_2S_2O_3$), and combinations thereof.

In some embodiments, the photochromic composition further comprises a matrix surrounding the semiconductor nanoparticles, in addition to the organic ligands bonded to the semiconductor nanoparticles. In some embodiments, hole-accepting molecules are present in the matrix surrounding the semiconductor nanoparticles. The hole-accepting matrix molecules may be porphyrins (heterocyclic macrocycle organic compounds) with unsaturated carbon-carbon bonds, for example. The concentration of hole-accepting matrix molecules may be used to control the decolorization time. Greater concentrations of hole-accepting matrix molecules typically result in shorter decolorization times.

In various embodiments, the matrix (if present) surrounding the semiconductor nanoparticles is or contains an organic polymer, an organic electrolyte, or a combination thereof, for example.

In some embodiments using a matrix surrounding the semiconductor nanoparticles, electrolyte polymers allow electrochemical tuning of the dopant oxidation state if a potential is held across the matrix. Electrolyte polymers for the matrix may be selected from polyethylene oxide, polypropylene oxide, polycarbonates, or polysiloxanes, for example. An electrolyte polymer may be a polyethylene oxide complex formed with a metal salt, such as PEO—Cu$(CF_3SO_3)_2$ which is a Cu-ion conductor according to Bonino et al., "Electrochemical properties of copper-based polymer electrolytes" Electrochim Acta, Volume 37, Issue 9, Pages 1711-1713 (1992), which is incorporated by reference. A gel electrolyte may be utilized, such as a liquid electrolyte (aqueous or non-aqueous solvent+salt) in a polymer host. Liquid electrolyte solvents may be water, dimethyl carbonate, diethyl carbonate, propylene carbonate, ethylene carbonate, γ-butyrolactone, or a combination thereof, for example. Salts in the liquid electrolyte may be salts of any of transition metals, metalloids, alkali metals, or alkaline earth metals. For example, salts in the liquid electrolyte may be salts of V, Ti, Cr, Co, Ni, Cu, Zn, Tb, W, Ag, Cd, Au, Al, Ga, Ge, As, Se, Sn, Sb, Te, Bi, Li, Na, K, Mg, Ca, or a combination thereof.

Alternatively, or additionally, the matrix (if present) surrounding the semiconductor nanoparticles may be or contain an inorganic oxide. An inorganic oxide may be selected from the group consisting of $SiO_2$, ZnO, $Al_2O_3$, $ZrO_2$, and combinations thereof, for example.

The matrix (if present) surrounding the semiconductor nanoparticles may be or contain a solid electrolyte. For example, the solid electrolyte may be selected from oxide-based electrolytes, such as β-alumina, Cu-β-alumina, Ag-β- alumina, or a combination thereof. The solid electrolyte may be selected from sulfide-based electrolytes, such as $Li_{10}GeP_2S_{12}$, $Na_2S—P_2S_5$, $Li_2S—P_2S_5$, or a combination thereof. The solid electrolyte may be selected from LiSiCON, i.e. lithium superionic conductor, which refers to a family of solids with the chemical formula $Li_{2+2x}Zn_{1-x}GeO_4$ ($-0.5<x<1$). The solid electrolyte may be selected from cuprous halides, such as CuCl, CuBr, CuI, or a combination thereof. The solid electrolyte may be a copper sulfide, such as $Cu_{2-\alpha}S$ ($0\leq\alpha\leq1$). The solid electrolyte may be or include a $Ag^+$ conductor, such as AgI (0.1 S/cm at 150° C.), $AgI—Ag_2SeO_4$, $RbAg_4I_5$, or a combination thereof.

In some embodiments, the photochromic composition is characterized in that the step of accepting transfer of the photoexcited hole takes place on a time scale of about 1 second or less. In various embodiments, the photochromic composition is characterized in that the step of accepting transfer of the photoexcited hole takes place on a time scale of about, or at most about, 1000, 900, 800, 700, 600, 500, 400, 300, 250, 200, 150, 100, 75, 50, 40, 30, 20, 10, or 5 milliseconds (ms), including any intervening range.

Transient extreme ultraviolet (XUV) spectroscopy may be utilized to measure the time scale of photoexcited-hole transfer, for example. See Liu et al., "Measuring Photoexcited Electron and Hole Dynamics in ZnTe and Modeling Excited State Core-Valence Effects in Transient Extreme Ultraviolet Reflection Spectroscopy", *J. Phys. Chem. Lett.* 2023, 14, 2106-2111, which is hereby incorporated by reference.

Some embodiments can be understood with reference to FIG. 1, which depicts an exemplary photochromic composition 100 (not drawn to scale) and is a two-dimensional representation of a three-dimensional object. The photochromic composition 100 may also be referred to as a photochromic assembly. In FIG. 1, the photochromic composition 100 comprises a semiconductor nanoparticle 110, many transition-metal dopant particles 120 disposed on surfaces of, and/or within, the semiconductor nanoparticle 110, and many organic ligands 130 bonded to the semiconductor nanoparticle 110. The number of transition-metal dopant particles 120 and the number of organic ligands 130 may vary; the specific numbers shown in FIG. 1 (15 transition-metal dopant particles 120 and 11 organic ligands 130) are arbitrary and only for purposes of illustration. In typical embodiments, there would be a plurality of semiconductor nanoparticles 110, not just a single semiconductor nanoparticle 110 (e.g., see FIG. 2). The transition-metal dopant particles 120 that are shown within the circle representing the semiconductor nanoparticle 110 can be regarded as either attached to the outer surface of the semiconductor nanoparticle 110, or disposed within the semiconductor nanoparticle 110 (i.e., within an internal phase of the nanoparticle). The organic ligand 130 at about the 11 o'clock position is behind (obscured by) the transition-metal dopant particle 120, and is not chemically bonded to the transition-metal dopant particle 120. The semiconductor nanoparticle 110 preferably has a diameter of about 1 nm to about 20 nm. The size of the transition-metal dopant particles 120 may vary. The transition-metal dopant particles 120 are by no means limited to an aspect ratio of 1:6 (diameter of a metal dopant particle 120 divided by diameter of semiconductor nanoparticle 110) as implied in FIG. 1. Also, the molecular size of the organic ligands 130 may vary. The organic ligands 130 are by no means limited to an aspect ratio of 1:1 with the transition-metal dopant particles 120 (outward length of an organic ligand 130 divided by diameter a metal dopant particle 120). The semiconductor nanoparticle 110 and the transition-metal dopant particles 120 are not necessarily spherical as illustrated in FIG. 1. The organic ligand 130 will generally take a molecular shape (e.g., linear or bent) dictated by local bonding and electrostatic forces.

Other variations provide a photochromic system with an on/off switch, wherein the photochromic system comprises:

(i) a photochromic composition comprising: (a) semiconductor nanoparticles that have an average nanoparticle effective diameter from about 1 nanometer to about 20 nanometers, wherein the semiconductor nanoparticles do not include ZnS, ZnSe, ZnTe, or ZnInS; (b) transition-metal dopant particles disposed on surfaces of the semiconductor nanoparticles and/or within the semiconductor nanoparticles, wherein the transition-metal dopant particles are capable of undergoing reversible oxidation and reduction; and (c) organic ligands bonded to the semiconductor nanoparticles, wherein the organic ligands each contain at least one carbon-carbon aromatic bond, at least one carbon-carbon double bond, or at least one carbon-carbon triple bond, wherein the organic ligands are capable of accepting transfer of a photoexcited hole from the transition-metal dopant particles and/or the semiconductor nanoparticles, and wherein, on average, there are 8 or less carbon atoms between a bond site and the first carbon atom with an aromatic bond, a double bond, or a triple bond in the direction away from the bond site, wherein said bond site is the site at which one of the organic ligands bonds to one of the semiconductor nanoparticles; and (ii) an on/off switch configured to reversibly activate the photochromic composition, wherein the on/off switch is disposed in electrical or electrochemical communication with the photochromic composition.

In some embodiments of the photochromic system, the on/off switch is configured to apply an electric field to the semiconductor nanoparticles. The electric field may be provided by one or more electrodes disposed in electrical communication with the semiconductor nanoparticles. The one or more electrodes may include sheet electrodes, wire-grid electrodes, or a combination thereof. The material of the one or more electrodes may be or include conducting metal oxide electrodes, conducting polymer electrodes, or a combination thereof. In some embodiments, the electric field is configured to quench emissive electron-hole recombination.

In some embodiments of the photochromic system, the on/off switch is configured to apply an electrochemical potential to the semiconductor nanoparticles. An electrochemical potential means that there is a potential difference between two half cells in the photochromic system, wherein the potential difference is caused by the ability of electrons to flow from one half cell to the other. The electrochemical potential may be provided by one or more electrodes disposed in electrochemical communication with the semiconductor nanoparticles. The one or more electrodes may include sheet electrodes, wire-grid electrodes, or a combination thereof. In other embodiments, there is a flow of electrolytes without an electrical power supply, to establish an electrochemical potential applied to the semiconductor nanoparticles.

In some embodiments of the photochromic system, the on/off switch is configured to electrochemically oxidize or reduce the transition-metal dopant particles. In the on state, the transition-metal dopant particles are electrochemically oxidized, causing an electron to be lost from an orbital, thereby creating a hole. In the off state, the transition-metal dopant particles are electrochemically reduced, causing an electron to be gained. The on/off switch thus enables a reversible redox reaction of the transition-metal dopant particles. In these embodiments, the on/off switch may utilize electrodes with or without electrolytes, or electrolytes with no electrodes—e.g. redox electrolyte-aided hybrid energy-storage systems.

In some embodiments of the photochromic system, the on/off switch is configured to optically oxidize or reduce the transition-metal dopant particles. In the on state, the transition-metal dopant particles are optically oxidized, using one or more photons to cause an electron to be lost from an orbital, thereby creating a hole. In the off state, the transition-metal dopant particles are optically reduced, allowing an electron to be gained while emitting one or more photons. The optical on/off switch thus enables a reversible redox reaction of the transition-metal dopant particles.

In some embodiments of the photochromic system, the on/off switch is configured to prevent the transition-metal dopant particles from changing their oxidation state, thereby shutting down the photochromism. In these embodiments, the on/off switch may utilize an electric field, an electrochemical field, and/or an optical field applied to the semiconductor nanoparticles to minimize changes to dopant-particle oxidation states, or prevent changes to dopant-particle oxidation states, which turns off the photochromic function of the system.

In some embodiments, the photochromic system is characterized in that accepting transfer of the photoexcited hole takes place on a time scale of about 1 second or less. In various embodiments, the photochromic system is characterized in that accepting transfer of the photoexcited hole takes place on a time scale of about, or at most about, 1000, 900, 800, 700, 600, 500, 400, 300, 250, 200, 150, 100, 75, 50, 40, 30, 20, 10, or 5 milliseconds (ms), including any intervening range.

In some embodiments, the photochromic system is characterized in that when the photochromic system is in the off state, the photochromic system allows greater than 90% transmission of incident visible or infrared light with energy below a bandgap of the semiconductor nanoparticles. In various embodiments, in the off state, the percent transmission of incident visible or infrared light with energy below a bandgap of the semiconductor nanoparticles is about, or at least about, 80%, 85%, 90%, 91%, 92%, 93%, 94%, 95%, 96%, 97%, 98%, 99%, or 100%, including any intervening ranges.

An energy below a bandgap of the semiconductor nanoparticles will depend on the specific nanoparticles employed. For example, in the case of the semiconductor nanoparticles being PbS, lead sulfide is known to have a bandgap of 0.41 eV. Light with at least this energy, which corresponds to a wavelength of about 3 μm, will cause electrons in PbS to jump from the valence band to the conduction band. Thus, in this particular case, incident light with energy below the PbS bandgap will be light having a wavelength greater than 3 μm, such as light in the MWIR spectrum or LWIR spectrum.

In some embodiments, the photochromic system is characterized in that when the photochromic system is in the on state, the photochromic composition allows less than 20% transmission of incident visible or infrared light with energy below the bandgap of the semiconductor nanoparticles. In various embodiments, in the on state, the percent transmission of incident visible or infrared light with energy below a bandgap of the semiconductor nanoparticles is about, or at most about, 20%, 15%, 10%, 9%, 8%, 7%, 6%, 5%, 4%, 3%, 2%, 1%, or 0%, including any intervening ranges.

Some embodiments can be understood with reference to FIG. 2, which depicts an exemplary photochromic system and is a two-dimensional representation (side view) of a three-dimensional object. FIG. 2 is not drawn to scale. In FIG. 2, the photochromic system contains a plurality of photochromic assemblies 200, which are shown in zoomed-in form in FIG. 1. In particular, FIG. 1 depicts a single photochromic assembly 100, while FIG. 2 depicts many photochromic assemblies 200. Each photochromic assembly 200 comprises a semiconductor nanoparticle, transition-metal dopant particles disposed on surfaces of, and/or within, the semiconductor nanoparticle, and organic ligands bonded to the semiconductor nanoparticle (for clarity, the individual elements of each photochromic assembly 200 are not labeled in FIG. 2 but are labeled in FIG. 1). The photochromic assemblies 200 may be surrounded by a matrix 202, which may contain an organic material, an inorganic material, or a combination thereof. The matrix 202 surrounds the semiconductor nanoparticles. The matrix 202 may go between the organic ligands and may touch the dopant particles, if the matrix is well-mixed. Alternatively, the matrix 202 may surround the outer tips of the organic ligands but not penetrate all the way to the semiconductor nanoparticle, forming a matrix bubble (of vacuum or gas) around each nanoparticle. In other embodiments that do not utilize a matrix at all, region 202 is empty space, forming porosity between photochromic assemblies 200, which may be completely empty (vacuum) or may be filled with a gas, such as air or nitrogen. The photochromic assemblies 200 collectively form a photochromic region 201 that is interposed between a first electrode 203 and a second electrode 204. Each of the electrodes 203/204 is disposed in electrical or electrochemical communication with the photochromic region 201, and preferably with all of the photochromic assemblies 200. The polarities (+/−) of the electrodes 203/204 are opposite during operation, such that one electrode is positive and the other electrode is negative. The electrodes 203/204 are each connected to electrical leads (not shown) so that the electrodes may be activated when desired. When the electrodes 203/204 are activated, they may receive or transmit electrical current. Alternately, or additionally, when the electrodes 203/204 activated, they may electrochemically receive or transmit ions. The activation of electrodes 203/204 may be performed on demand, such as via a computer. In this way, the electrodes 203/204 collectively function as an on/off switch configured to reversibly activate the photochromic region 201.

Other variations provide a method of reversing photochromism of a photochromic composition, the method comprising:

(i) providing a photochromic composition comprising: (a) semiconductor nanoparticles that have an average nanoparticle effective diameter from about 1 nanometer to about 20 nanometers, wherein the semiconductor nanoparticles do not include ZnS, ZnSe, ZnTe, or ZnInS; (b) transition-metal dopant particles disposed on surfaces of the semiconductor nanoparticles and/or within the semiconductor nanoparticles, wherein the transition-metal dopant particles are capable of undergoing reversible oxidation and reduction; and (c) organic ligands bonded to the semiconductor nanoparticles, wherein the organic ligands contain a carboxylate functional group, a thiol functional group, an amine functional group, or a combination thereof;

(ii) photoexciting at least some of the semiconductor nanoparticles, thereby creating a plurality of photoexcited holes;

(iii) moving at least some of the plurality of photoexcited holes into an atomic orbital associated with the transition-metal dopant particles, thereby generating dopant-contained holes; and (iv) trapping at least some of the dopant-contained holes in the organic ligands and/or in a matrix surrounding the semiconductor nanoparticles, thereby reversing photochromism of the photochromic composition.

In some methods, the semiconductor nanoparticles are selected from the group consisting of single-element nanoparticles, two-element nanoparticles, three-element nanoparticles, four-element nanoparticles, and combinations thereof.

Single-element semiconductor nanoparticles may be selected from the group consisting of Si, Ge, and combinations thereof, for example. A combination of Si and Ge, when used as single-element nanoparticles, means that both Si nanoparticles and Ge nanoparticles are present and do not form any chemical bonds therebetween.

Two-element semiconductor nanoparticles may be selected from the group consisting of CdS, CdSe, CdTe, PbS, PbSe, PbTe, InP, InAs, InSb, GaP, GaAs, $Ag_2S$, and combinations thereof, for example. Combinations of two-element nanoparticles mean mixtures, not chemically bonded forms of different two-element nanoparticles, recognizing that a two-element nanoparticle itself contains chemical bonding between the elements. For example, Pb is bonded to S in lead sulfide, PbS; but a combination of PbS and GaAs does not have chemical bonding between PbS and GaAs in the case of solely two-element nanoparticles being used.

Three-element semiconductor nanoparticles may be selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, and combinations thereof, wherein $0<x<1$, for example. Combinations of three-element nanoparticles mean mixtures, not chemically bonded forms of different three-element nanoparticles, recognizing that a three-element nanoparticle itself contains chemical bonding between the elements.

Four-element semiconductor nanoparticles may be selected from the group consisting of copper indium gallium selenide, copper zinc tin sulfide, and combinations thereof, for example. Combinations of four-element nanoparticles mean mixtures, not chemically bonded forms of different four-element nanoparticles, recognizing that a four-element nanoparticle itself contains chemical bonding between the elements.

In some methods, the transition-metal dopant particles contain a transition metal selected from the group consisting of Cu, Fe, Ag, Eu, and combinations thereof.

In some methods, the transition-metal dopant particles are disposed on surfaces of the semiconductor nanoparticles. Alternatively, or additionally, the transition-metal dopant particles may be disposed within the semiconductor nanoparticles (i.e., within the bulk phase of the nanoparticles). In preferred methods, the transition-metal dopant particles are disposed both on surfaces of, and in a bulk phase of, the semiconductor nanoparticles.

In step (iii), photoexcited holes in the semiconductor nanoparticles move into an atomic orbital associated with the transition-metal dopant particles, thereby generating dopant-contained holes. A "dopant-contained hole" means an electron hole contained in an orbital of a dopant particle. An electron in the dopant particle is transferred to the semiconductor nanoparticle, to the organic ligand, or to another matrix material, thereby creating a hole in the orbital of the dopant particle. The hole may be a light hole or a heavy hole. The exact electron orbital from which the electron moves out from the dopant particle may generally be predicted by quantum mechanics, although the present invention is not limited to the specific orbital(s) from which electrons may create holes. Tunneling or other phenomena may cause holes to be created in orbitals that are not predicted by a standard electron-configuration model—for example, a hole may be created in an orbital different than the least-stable orbital. Holes may dynamically hop around various orbitals prior to ultimately being fully transferred out of the electron cloud of the dopant particle. As one specific example, when the dopant particle is copper, a photoexcited electron may leave the 4*s* orbital or the 3*d* orbital of the copper atom.

In some methods, the organic ligands include functional groups selected from carboxylates, thiols, amines, or a combination thereof. Organic ligands with carboxylates may be selected from the group consisting of 4-pentenoate, phenylacetate, 3-phenylpropionate, 4-phenylbutyrate, oleate, methacrylate, and combinations thereof, for example. Organic ligands with thiols may be selected from the group consisting of 2-propene-1-thiol, benzenethiol, and combinations thereof, for example. Organic ligands with amines may be selected from the group consisting of porphyrins, aniline, benzylamine, phenethylamine, phenylpropylamine, oleylamine, 2-aminoethanol, 3-aminopropanol, and combinations thereof, for example.

In step (ii), photoexcitation of semiconductor nanoparticles takes place at a wavelength that initiates the photochromic absorption effect (darkening). A wavelength that initiates (triggers) photochromic darkening may be in the visible spectrum, which is 400 nm to 750 nm for purposes of this specification. Alternatively, or additionally, a wavelength that initiates photochromic darkening may be in the infrared spectrum, which is 751 nm to 1 mm. A wavelength that initiates photochromic darkening may be in the near infrared (NIR) spectrum, which is 751 nm to 1400 nm. A wavelength that initiates photochromic darkening may be in the short-wavelength infrared (SWIR) spectrum, which is 1401 nm to 3000 nm. A wavelength that initiates photochromic darkening may be in the mid-wavelength infrared (MWIR) spectrum, which is 3001 nm to 8000 nm. A wavelength that initiates photochromic darkening may be in the long-wavelength infrared (LWIR) spectrum, which is 8001 nm to 15000 nm (15 μm). There may be multiple wavelengths (e.g., a range of wavelengths) that initiate photochromic darkening.

As stated earlier, the wavelengths that trigger the photochromic darkening can be different than the absorbed wavelengths from the photochromic effect. A wavelength that is absorbed during photochromic darkening may be in the visible spectrum, Alternatively, or additionally, a wavelength that is absorbed during photochromic darkening may be in the infrared spectrum. A wavelength that is absorbed during photochromic darkening may be in the NIR spectrum, the SWIR spectrum, the MWIR spectrum, and/or LWIR spectrum, for example. There may be multiple wavelengths (e.g., a range of wavelengths) that are absorbed during photochromic darkening.

In typical embodiments, the wavelength range that is absorbed during photochromic darkening is broader (wider) that the wavelength range that triggers the photochromic darkening. This feature results from the fact that the wavelength range that is absorbed to trigger darkening does not change when the particles darken, resulting in the darkened nanoparticle absorb a broader range of wavelengths. For example, Zn absorbs at wavelengths shorter than 350 nm; when Zn darkens, there is also absorption in the 400-900 nm range of wavelengths. The undark Zn particle absorbs only at <350 nm; the darkened particle still absorbs at <350 nm and additionally absorbs at 400-900 nm.

Photoexcitation of semiconductor nanoparticles in step (ii) is generally very fast, if incoming light has an energy greater than the bandgap energy of the semiconductor nanoparticles. A typical timescale of the photoexcitation is about 100 picoseconds to about 10 nanoseconds.

In step (iii), the time scale of moving at least some of the photoexcited holes into an atomic orbital associated with the transition-metal dopant particles, may be about 1 second or less. In various embodiments, the time scale is about, or at most about, 1000, 900, 800, 700, 600, 500, 400, 300, 250, 200, 150, 100, 75, 50, 40, 30, 20, 10, or 5 milliseconds (ms), including any intervening range. Note that, typically, one photoexcited hole moves into one atomic orbital associated with one transition-metal dopant particle. It is possible for multiple photoexcited holes to move into a single atomic orbital of a transition-metal dopant particle.

In step (iv), the photochromic darkening effect is passively (automatically) reversed by trapping at least some (e.g., all) of the dopant-contained holes in the organic ligands and/or in a matrix surrounding the semiconductor nanoparticles. This hole trapping reverses the photochromism of the photochromic composition, from the photochromic state present after photoexciting the semiconductor nanoparticles in step (ii) and/or after creating dopant-contained holes in step (iii).

In some methods, reversing photochromism in step (iv) takes place on a time scale of about 20 seconds or less. This time scale may also be referred to as the relaxation time or the photochromic reversal time. The relaxation time is measured in the solid state (not in solution) and is calculated as the time to achieve 90% reduction in the maximum photochromic darkening that occurs prior to step (iv). In various embodiments, the relaxation time for solid-state reversible chromatism in step (iv) is about, or at most about, 20, 19, 18, 17, 16, 15, 14, 13, 12, 11, 10, 9, 8, 7, 6, 5, 4, 3, 2, 1, 0.5, or 0.1 seconds, including any intervening range.

The maximum photochromic darkening that occurs prior to step (iv) refers to the phototransformation of the photochromic composition in a state of maximum light absorption (or minimum light transmission) at a given wavelength. When multiple wavelengths are of interest, the photochromic reversal time may be a function of wavelength.

As an example to illustrate the calculation, after the photoexcited holes are transferred into atomic orbitals associated with the transition-metal dopant particles, there may be 95% light absorption at a wavelength of 1000 nm, at the peak of maximum light absorption. During step (iv), the photochromism may be completely reversed, to a state of 0% light absorption. The photochromic reversal time is calculated as the time at which the photochromic composition reaches 5% light absorption, since 95%-5%=90%. The photochromic reversal time in this example is calculated starting from the peak of 95% light absorption, or from the start of the peak if the composition maintains maximum photochromic darkening for an appreciable period of time.

The protection time that may pass from step (ii) to the start of step (iv) may vary. This protection time is dictated, at least in part, by the period of time for which the photoexciting light is impinging on the photochromic composition, which in turn will be determined by the specific use of the photochromic composition and environmental/external factors. The protection time may be very short, such as a UV light pulse on the order of seconds; or may be longer, such as minutes, hours, or even days or more. During the protection time, detinting does not effectively begin—i.e., protection continues due to the photochromic effect. (In reality, the semiconductor nanoparticles are darkening and relaxing the whole time; if the photoexciting light is still impinging, then as the semiconductor nanoparticles relax, they also absorb more light and oscillate to the darkened state. This process repeats many times until the photoexciting light is no longer exposed to the photochromic composition. The net macroscopic effect is that detinting does not begin until the photoexciting light is no longer impinging.)

The protection time is different than the photochromic reversal time. In some embodiments, the protection time is about the same as, or greater than, the photochromic reversal time. In other embodiments, the protection time is less than the photochromic reversal time. When the photochromism reversal starts, which starts the clock for the photochromic reversal time, some amount of photochromic protection may still exist.

Some methods further comprise reversibly activating the photochromic composition utilizing an on/off switch disposed in electrical or electrochemical communication with the photochromic composition. In certain methods, the on/off switch applies an electric field to the semiconductor nanoparticles. In these or other methods, the on/off switch applies an electrochemical potential to the semiconductor nanoparticles. In certain methods, the on/off switch electrochemically oxidizes or reduces the transition-metal dopant particles.

The on/off function can be mediated by the application of an external bias. Typically, in molecular photochromics, the application of a potential moves molecular mass to induce a conformational change which results in the photochromic effect being controllable via an on/off switch. In embodiments of the disclosed technology, fast photochromic switching can be controlled similarly with bias by saturating the discretely tunable electronic levels of photochromic nanoparticles. The electric or electrochemical field necessary to quench or saturate the photochromic state on demand can be generated in multiple ways. In some embodiments, a deposited film is used to establish an electrical or electrochemical field on demand.

To preserve the optical and aesthetic quality of the deposited film, transparent metal-oxide films may be utilized to generate a uniform field across the substrate to passivate the photochromicity. Transparent conductive oxides may be $SnO_2$ doped with In or F. The transparent metal-oxide film may have high transmissivity (such as >80%), while retaining high carrier mobility. These films may be deposited via magnetron sputtering, chemical vapor deposition, epitaxial growth, solution deposition, spraying, or pulsed laser deposition, for example. Other doped oxides which may be used as films to induce the electric field and provide the on/off function may be doped binary compounds such as ZnO, with Al dopants or other transition-metal dopants such as Mo or Ta, which give access to higher electron-mobility and electron-conductivity regimes compared to $SnO_2$. Other wide-bandgap, correlated perovskite crystal structures such as $BaSnO_3$, $SrVO_3$, or $CaVO_3$ may be utilized for an electric field-generating bed as well. Outside of metallic or oxide-based materials, transparent conducting polymers such as poly(3,4-ethylenedioxythiophene), poly(styrene sulfonate), poly(4,4-dioctyl cyclopentadithiophene), or combinations thereof, have tunable, conjugated double bonds that promote conduction and selective light absorption.

In some embodiments, the deposited film is patterned. Patterning may be accomplished via photolithographic and etching steps which enable highly specific, nanometer-scale, transparent wire geometries. Specified geometries of wires allow for field enhancement which funnels the electrical or electrochemical field more efficiently into the rapid saturation of the photochromic effect. The photochromic nanoparticles may be deposited onto the wire grids and supported by additional electron-transporting and hole-transporting layers which contribute to charge motion in the overall circuit that acts as an on/off switch for the photochromic darkening.

Some methods are characterized in that when the photochromic composition is in the off state, the photochromic composition allows greater than 90% transmission of incident visible or infrared light with energy below a bandgap of the semiconductor nanoparticles. In various methods, in the off state, the percent transmission of incident visible or infrared light with energy below a bandgap of the semiconductor nanoparticles is about, or at least about, 80%, 85%, 90%, 91%, 92%, 93%, 94%, 95%, 96%, 97%, 98%, 99%, or 100%, including any intervening ranges.

Some methods are characterized in that when the photochromic composition is in the on state, the photochromic composition allows less than 20% transmission of incident visible or infrared light with energy below a bandgap of the semiconductor nanoparticles. In various methods, in the on state, the percent transmission of incident visible or infrared light with energy below a bandgap of the semiconductor nanoparticles is about, or at most about, 20%, 15%, 10%, 9%, 8%, 7%, 6%, 5%, 4%, 3%, 2%, 1%, or 0%, including any intervening ranges.

There are many uses for the disclosed photochromic compositions and photochromic systems. The compositions or systems may be incorporated into lenses, windows, and sensors, for example.

Examples of window applications include windshields for vehicles, as well as windows for buildings. Windshield glare protection may be provided by self-darkening windows at a fraction of the cost of electrochromics. An example of a window application is observation windows for chemical reactors in which an operator needs to view inside a reactor that is carrying out a reaction releasing dangerous radiation, such as UV light.

Examples of sensor applications include IR sensors, visible-light sensors, UV sensors, and sensors that are configured to sense a property other than light but which may be impacted in performance by light—e.g., temperature sensors, pressure sensors, pH sensors, humidity sensors, CO sensors, $CO_2$ sensors, $CH_4$ sensors, ionizing-radiation sensors, magnetic sensors, and so on.

Other applications include, but are by no means limited to, switching polarizers, satellites, autonomous-vehicle cameras, solar-cell protection, and laser protection.

EXAMPLES

Example 1: Synthesis of Copper-Doped Zinc Sulfide Nanoparticles with 3-Mercaptopropionic Acid Ligands Chemical synthesis of Cu-doped ZnS nanocrystals is carried out as follows. In this example of a photochromic composition, ZnS is the semiconductor nanoparticle, copper is the transition-metal dopant particle, and 3-mercaptopropionic acid is the organic ligand.

Zinc acetate dihydrate, $Zn(CH_3COO)_2 \cdot 2H_2O$ (0.549 g, 2.5011 mmol), and copper acetylacetonate, $Cu(C_5H_7O_2)_2$ (0.007 g, 0.0253 mmol), are dissolved in deionized water (100 mL, 5549.4 mmol). Then, 3-mercaptopropionic acid, $HSCHCH_2CO_2H$ (1 mL, 11.494 mmol), is added to the solution. The pH of the mixed solution is adjusted to 10.3 with a 2 M aqueous solution of sodium hydroxide (NaOH). After sparging with argon (Ar) for 30 min, a 0.46 M aqueous solution of sodium sulfide, $Na_2S$ (2.5 mL, 1.1499 mmol), is injected into the solution under vigorous stirring at room temperature (about 25° C.). The mixed solution is kept for 15 min under magnetic stirring while sparging with Ar, then heated to 100° C. for 24 hr to form nanocrystals. The obtained Cu-doped ZnS nanocrystals are precipitated using ethanol in a volumetric ratio of 4 parts reaction solution to 1 part, centrifuged at 4,000 revolutions per minute (rpm) for 5 min, resulting in a precipitate. The precipitate is then dried in vacuum at 50° C.

Isolated Cu-doped ZnS nanocrystals are ground to a fine powder using a pestle and mortar. The finely ground nanocrystals (100 mg) are added to a solution containing 1,2 addition polybutadiene (556 mg), 1,2,4-triethylmercaptan cyclohexane (333 mg), and xylenes (100 mg). The polybutadiene contains about 90% of 1,2-vinyl-addition polymer chains. This solution is vortex-mixed to homogeneity, and then spin-cast at 2000 rpm for 30 seconds on a glass slide, to create a film. The film is then cured by exposure to an H-bulb with a power of 100 $mW/cm^2$ for 10 seconds. An H-bulb is a mercury vapor bulb that produces a conventional Hg spectral output, which includes light wavelengths distributed across the entire ultraviolet wavelength range.

Figure 3:
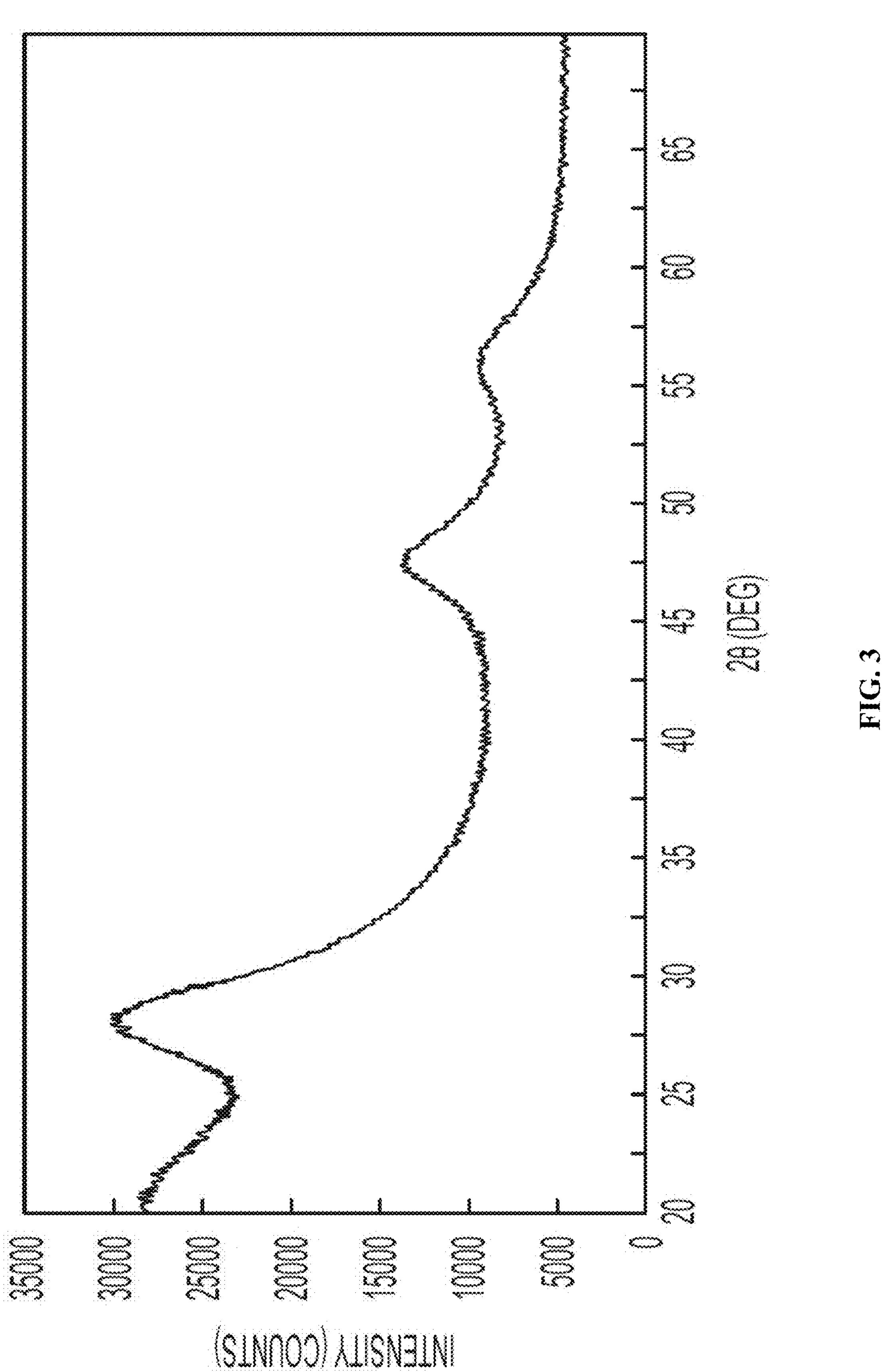
FIG. 3 shows an X-ray diffraction pattern of Cu-doped ZnS nanocrystals, in Example 1.

X-ray diffraction (XRD) analysis indicates crystallite size of about 3.1 nm for the Cu-doped ZnS nanocrystals. FIG. 3 shows the XRD pattern of the Cu-doped ZnS nanocrystals.

Figure 4:
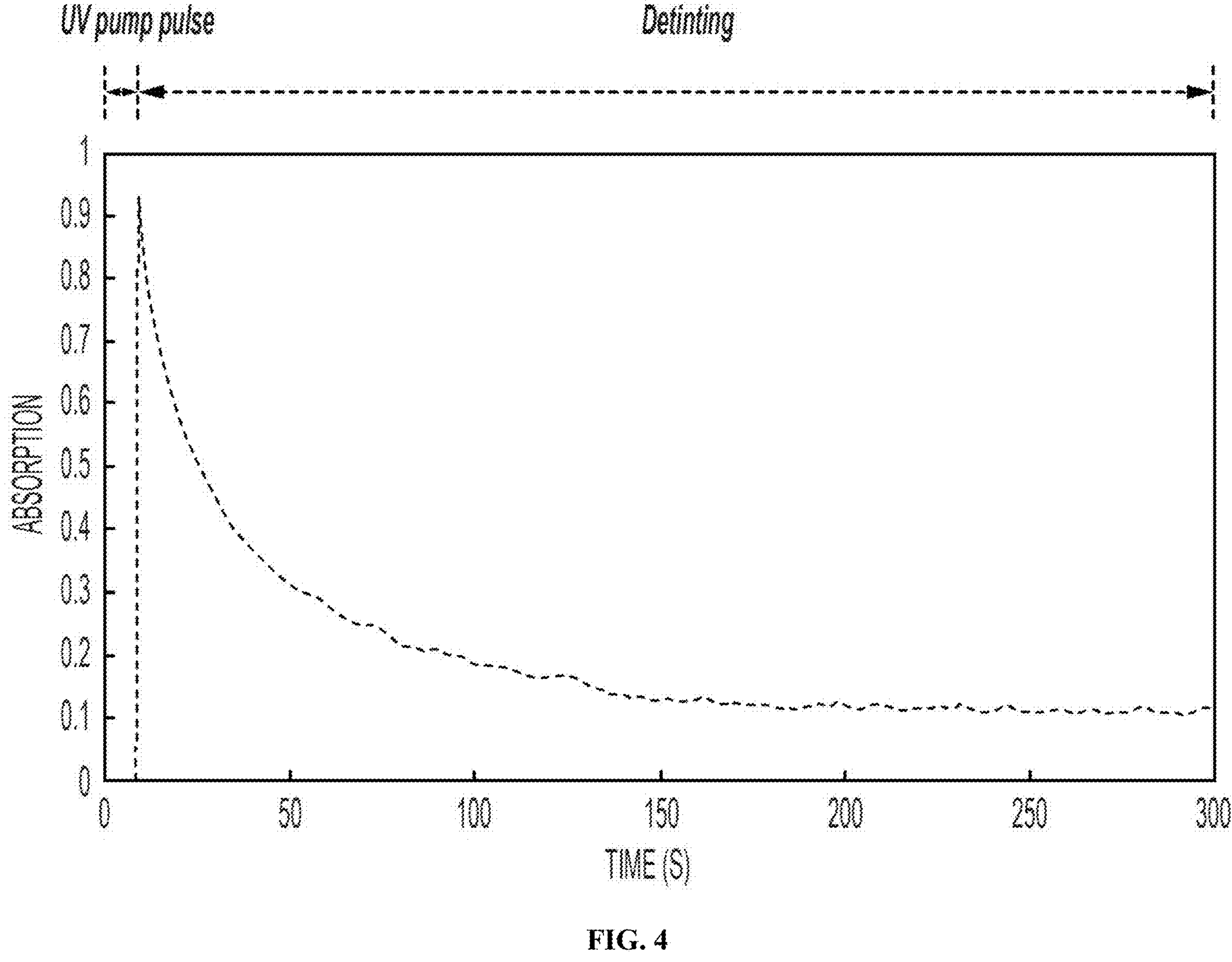
FIG. 4 is a plot of light absorption versus time in Example 1, revealing the photodarkening and detinting of Cu-doped ZnS nanocrystals.

Photodarkening of the Cu-doped ZnS nanocrystals is tested by exposing the nanocrystals to a 365-nm light source for about 10 seconds to initiate photochromism. The 365-nm light source is a UV LED. After exposure to UV light, the Cu-doped ZnS nanocrystals subsequently undergo detinting. This is shown in FIG. 4, which reveals the photodarkening and detinting of drop-cast Cu-doped ZnS nanocrystals with no polymer matrix (nanoparticles deposited on a glass slide). The plot of FIG. 4 shows light absorption versus time. The y-axis of FIG. 4 is fractional absorption probed at 600 nm (visible light); the maximum absorption of about 0.94 (94%) occurs during the UV pulse, followed by detinting after removal of the UV pulse. The absorption of light is passively reduced after the UV pump is turned off. The relaxation time for detinting in this Example 1 is 44 seconds, which is derived from FIG. 4 at the point corresponding to a derivative of-1%/s, indicating leveling off of detinting.

Example 2: Synthesis of Copper-Doped Zinc Cadmium Sulfide Nanoparticles with 3-Mercaptopropionic Acid Ligands Chemical synthesis of Cu-doped $Zn_{0.75}Cd_{0.25}S$ nanocrystals is carried out as follows. In this example of a photochromic composition, $Zn_{0.75}Cd_{0.25}S$ is the semiconductor nanoparticle, copper is the transition-metal dopant particle, and 3-mercaptopropionic acid is the organic ligand.

$Zn(CH_3COO)_2 \cdot 2H_2O$ (0.416 g, 1.875 mmol), $Cd(CH_3COO)_2 \cdot 2H_2O$ (0.1667 g, 0.625 mmol), and $Cu(CH_7O_2)_2$ (0.007 g, 0.0253 mmol) are dissolved in deionized water (100 mL, 5549.4 mmol). Then 3-mercaptopropionic acid (1 mL, 11.494 mmol) is added to the solution, and the pH of the mixed solution is adjusted to 10.3 with a 2 M aqueous solution of NaOH. After sparging with Ar for 30 min, a 0.46 M aqueous solution of $Na_2S$ (2.5 mL, 1.1499 mmol) is injected into the solution under vigorous stirring at room temperature. The mixed solution is kept for 15 min under magnetic stirring while sparging, then heated to 100° C. for 24 hr to form nanocrystals. The obtained nanocrystals are precipitated using ethanol (solution:ethanol=4:1 vol: vol), and centrifuged (4,000 rpm for 5 min), to recover a precipitate. The precipitate is then dried in vacuum at 50° C.

Isolated Cu-doped $Zn_{0.75}Cd_{0.25}S$ nanocrystals are ground to a fine powder using a pestle and mortar. These finely ground nanocrystals (100 mg) are added to a solution containing about 90 wt % 1,2-addition polybutadiene (556 mg), 1,2,4-triethylmercaptan cyclohexane (333 mg), and xylenes (100 mg). This solution is vortex-mixed to homogeneity, then spin-cast at 2000 rpm for 30 seconds on a glass slide. The films are then cured by exposure to an H-bulb with a power of 100 mW/cm$^2$ for 10 seconds. XRD analysis indicates an average crystallite size of 3.6 nm for the $Zn_{0.75}Cd_{0.25}S$ semiconductor nanoparticles.

Figure 5:
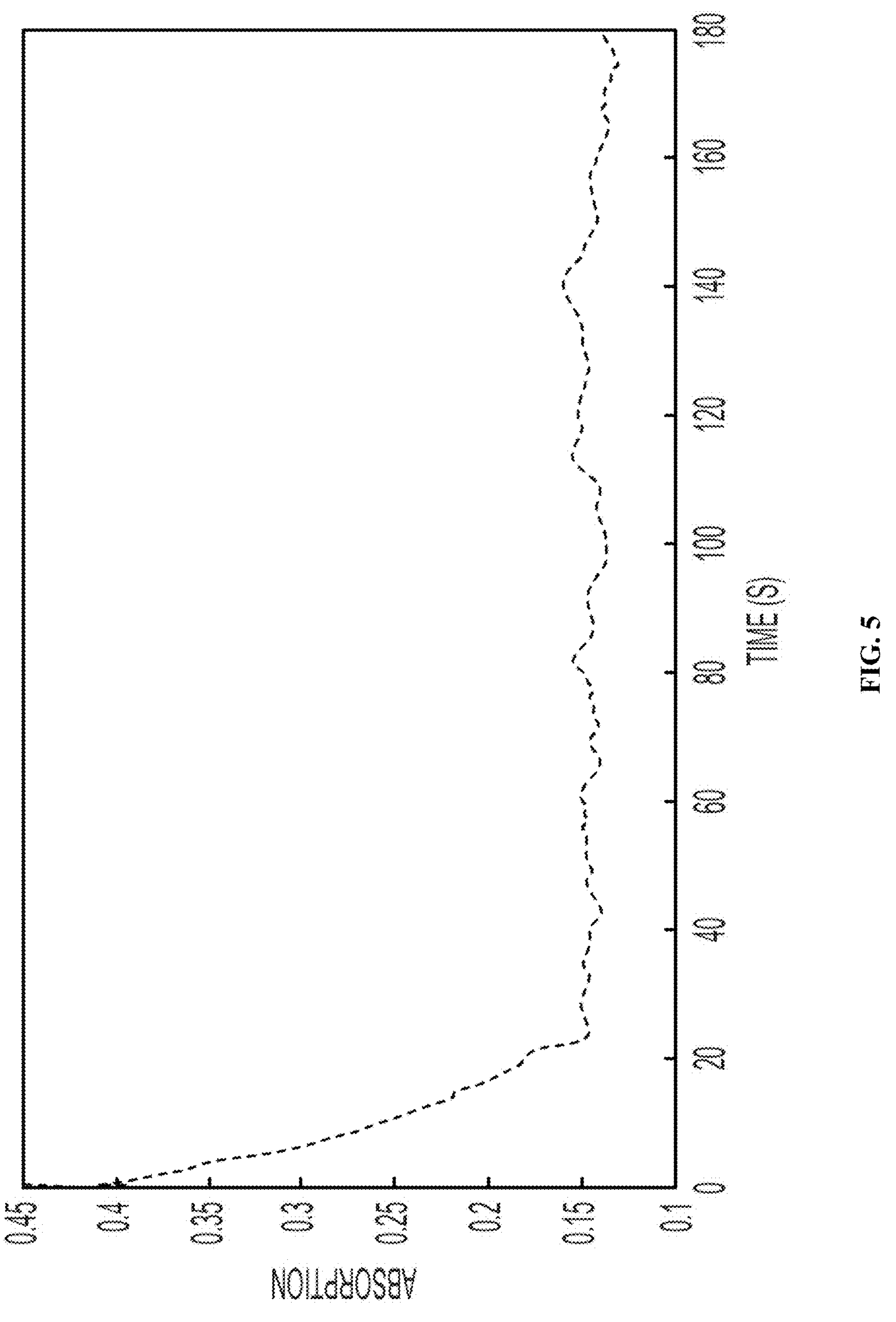
FIG. 5 is a plot of light absorption versus time in Example 2, revealing the photodarkening and detinting of Cu-doped $Zn_{0.75}Cd_{0.25}S$ nanocrystals.

Photodarkening of the Cu-doped $Zn_{0.75}Cd_{0.25}S$ nanocrystals is tested by exposing the nanocrystals to a 365-nm light source for about 10 seconds to initiate photochromism. The 365-nm light source is a UV LED. After exposure to UV light, the Cu-doped $Zn_{0.75}Cd_{0.25}S$ nanocrystals subsequently undergo detinting. This is shown in FIG. 5, which reveals the photodarkening and detinting of cast Cu-doped $Zn_{0.75}Cd_{0.25}S$ nanocrystals with a polymer matrix of polybutadiene and poly(trimethylene carbonate). The plot of FIG. 5 shows light absorption versus time. The y-axis of FIG. 5 is fractional absorption probed at 600 nm (visible light); the maximum absorption of about 0.41 (41%) occurs during the UV pulse, followed by detinting after removal of the UV pulse. The absorption of light is passively reduced after the UV pump is turned off. The relaxation time for detinting in this Example 2 is about 8 seconds, which is derived from FIG. 5 at the point corresponding to a derivative of-1%/s, indicating leveling off of detinting.

Example 3: Synthesis of Copper-Doped Zinc Cadmium Sulfide Nanoparticles with 3-Mercaptopropionic Acid Ligands Chemical synthesis of Cu-doped $Zn_{0.9}Cd_{0.1}S$ nanocrystals is carried out as follows. In this example of a photochromic composition, $Zn_{0.9}Cd_{0.1}S$ is the semiconductor nanoparticle, copper is the transition-metal dopant particle, and 3-mercaptopropionic acid is the organic ligand.

$Zn(CH_3COO)_2 \cdot 2H_2O$ (0.494 g, 2.25 mmol), $Cd(CH_3COO)_2 \cdot 2H_2O$ (0.067 g, 0.25 mmol), and $Cu(CsH_7O_2)_2$ (0.007 g, 0.0253 mmol) are dissolved in deionized water (100 mL, 5549.4 mmol). Then 3-mercaptopropionic acid (1 mL, 11.494 mmol) is added to the solution, and the pH of the mixed solution is adjusted to 10.3 with a 2 M aqueous solution of NaOH. After sparging with Ar for 30 min, a 0.46 M aqueous solution of $Na_2S$ (2.5 mL, 1.1499 mmol) is injected into the solution under vigorous stirring at room temperature. The mixed solution is kept for 15 min under magnetic stirring while sparging, then heated to 100° C. for 24 hr to form nanocrystals. The obtained nanocrystals are precipitated using ethanol (solution:ethanol=4:1 vol:vol), and centrifuged (4,000 rpm for 5 min), to recover a precipitate. The precipitate is then dried in vacuum at 50° C.

Isolated Cu-doped $Zn_{0.9}Cd_{0.1}S$ nanocrystals are ground to a fine powder using a pestle and mortar. These finely ground nanocrystals (100 mg) are added to a solution containing about 90 wt % 1,2-addition polybutadiene (556 mg), 1,2,4-triethylmercaptan cyclohexane (333 mg), and xylenes (100 mg). This solution is vortex-mixed to homogeneity, then spin-cast at 2000 rpm for 30 seconds on a glass slide. The films are then cured by exposure to an H-bulb with a power of 100 mW/cm$^2$ for 10 seconds.

Figure 6:
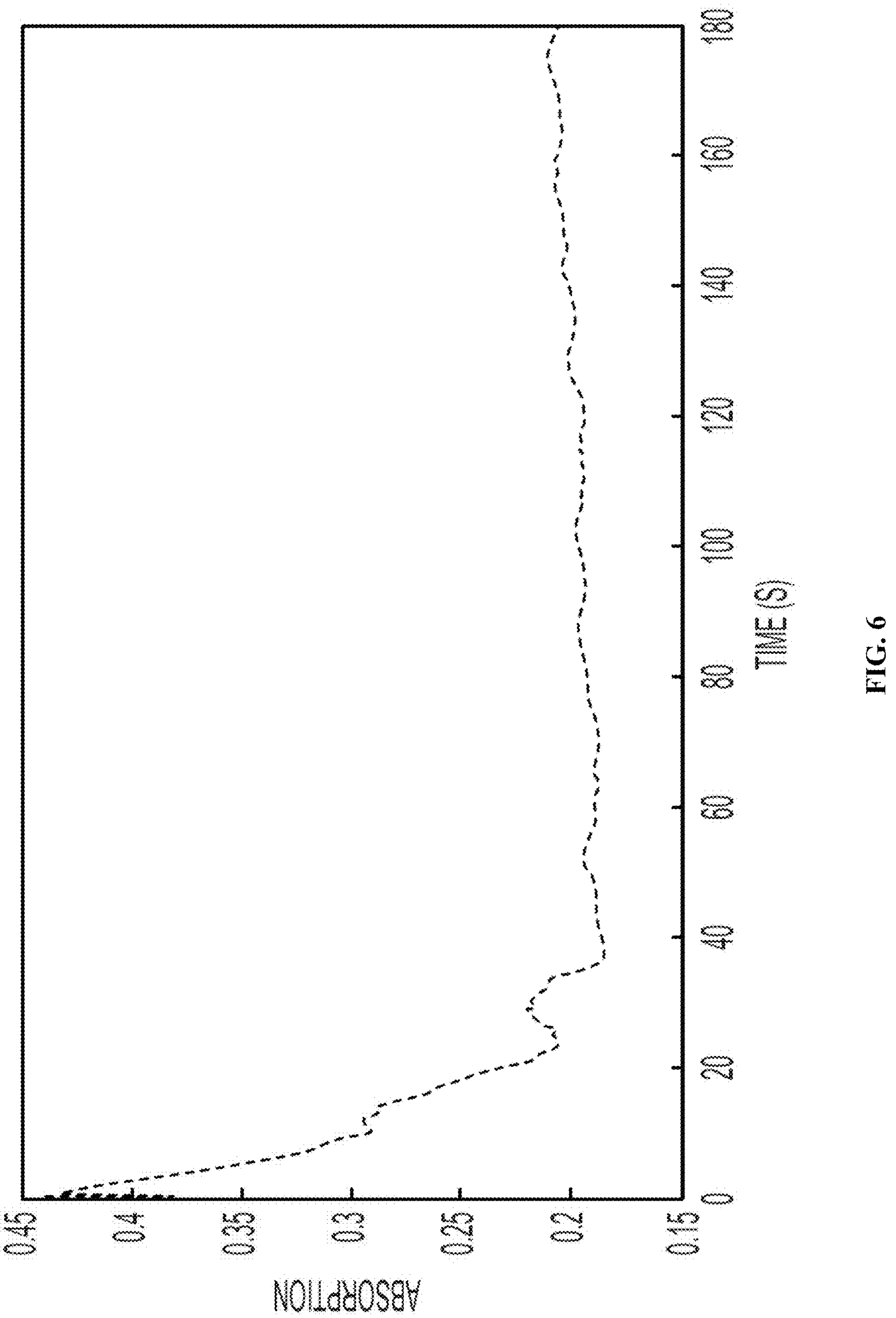
FIG. 6 is a plot of light absorption versus time in Example 3, revealing the photodarkening and detinting of cast Cu-doped $Zn_{0.9}Cd_{0.1}S$ nanocrystals.

Photodarkening of the Cu-doped $Zn_{0.9}Cd_{0.1}S$ nanocrystals is tested by exposing the nanocrystals to a 365-nm light source for about 10 seconds to initiate photochromism. The 365-nm light source is a UV LED. After exposure to UV light, the Cu-doped $Zn_{0.9}Cd_{0.1}S$ nanocrystals subsequently undergo detinting. This is shown in FIG. 6, which reveals the photodarkening and detinting of cast Cu-doped $Zn_{0.9}Cd_{0.1}S$ nanocrystals with a polymer matrix of polybutadiene and poly(trimethylene carbonate). The plot of FIG. 6 shows light absorption versus time. The y-axis of FIG. 6 is fractional absorption probed at 600 nm (visible light); the maximum absorption of about 0.41 (41%) occurs during the UV pulse, followed by detinting after removal of the UV pulse. The absorption of light is passively reduced after the UV pump is turned off. The relaxation time for detinting in this Example 3 is about 5 seconds, which is derived from FIG. 6 at the point corresponding to a derivative of-1%/s, indicating leveling off of detinting.

Figure 7:
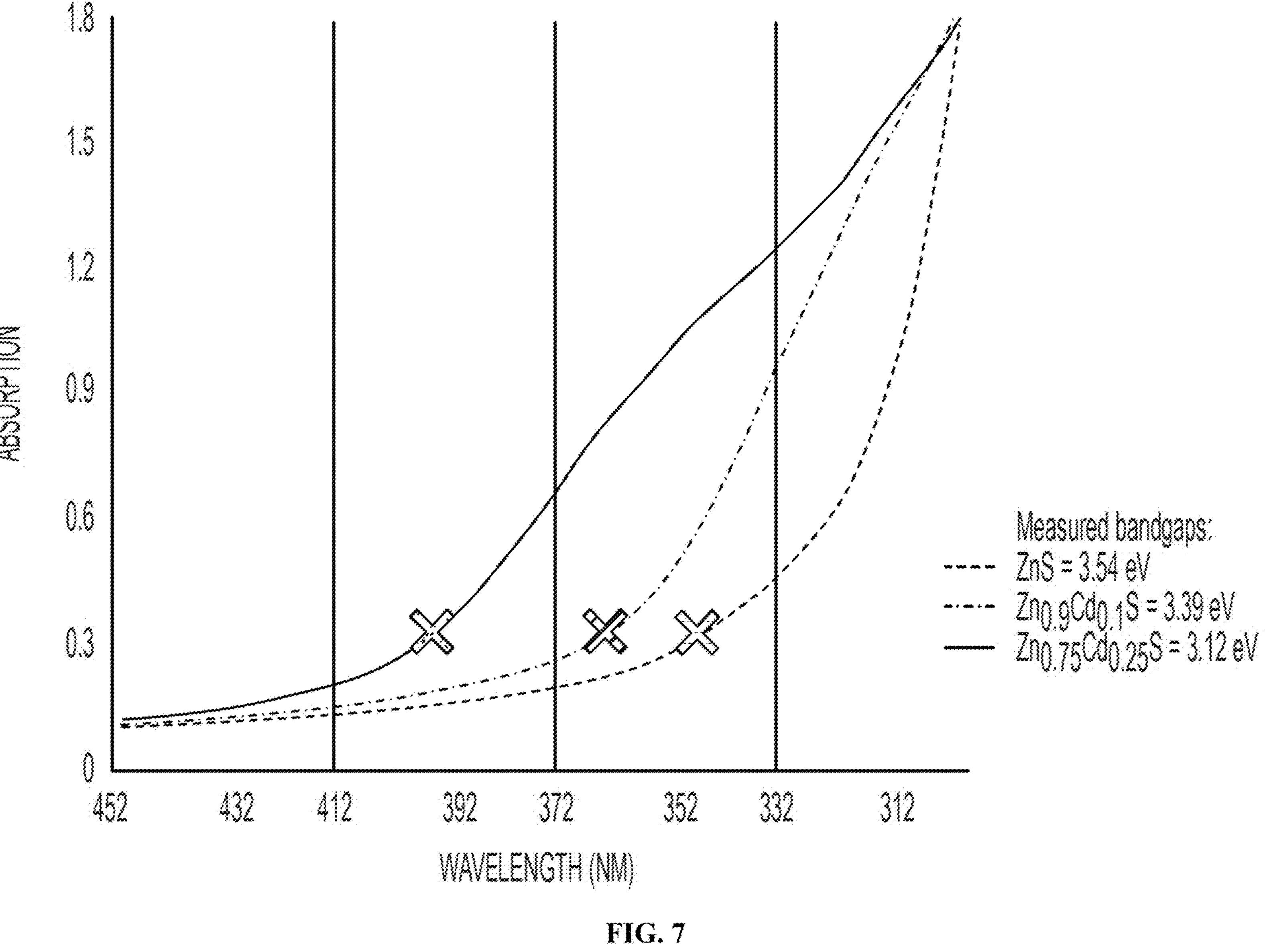
FIG. 7 shows aqueous absorption spectra of ZnS nanoparticles (Example 1), $Zn_{0.9}Cd_{0.1}S$ nanoparticles (Example 3), and $Zn_{0.75}Cd_{0.25}S$ nanoparticles (Example 2), revealing that increasing Cd content shifts the semiconductor bandgap to longer wavelengths.

FIG. 7 shows aqueous absorption spectra of ZnS nanoparticles (Example 1), $Zn_{0.9}Cd_{0.1}S$ nanoparticles (Example 3), and $Zn_{0.75}Cd_{0.25}S$ nanoparticles (Example 2), revealing that increasing Cd content shifts the semiconductor bandgap to longer wavelengths. The ternary compositions enable bandgap modification, allowing control of the photochromic trigger wavelength. The bandgap wavelength is shown by a×symbol on each data set. The measured bandgaps are 3.54 eV for ZnS, 3.39 eV for $Zn_{0.9}Cd_{0.1}S$, and 3.12 eV for $Zn_{0.75}Cd_{0.25}S$.

Example 4: Synthesis of Copper-Doped Zinc Lead Sulfide Nanoparticles with 3-Mercaptopropionic Acid Ligands Chemical synthesis of Cu-doped $Zn_{0.9}Pb_{0.1}S$ nanocrystals is carried out as follows. In this example of a photochromic composition, $Zn_{0.9}Pb_{0.1}S$ is the semiconductor nanoparticle, copper is the transition-metal dopant particle, and 3-mercaptopropionic acid is the organic ligand.

90 wt % $Zn(CH_3COO)_2 \cdot 2H_2O$ (0.494 g, 2.25 mmol), 10 wt % $Pb(CH_3COO)_2 \cdot 2H_2O$ (0.095 g, 0.25 mmol), and $Cu(CsH_7O_2)_2$ (0.007 g, 0.0253 mmol) are dissolved in deionized water (100 mL, 5549.4 mmol). Then 3-mercaptopropionic acid (1 mL, 11.494 mmol) is added to the solution, and the pH of the mixed solution is adjusted to 10.3 with a 2 M aqueous solution of NaOH. After $N_2$ bubbling for 30 min, a 0.46 M aqueous solution of $Na_2S$ (2.5 mL, 1.1499 mmol) is quickly injected into the solution under vigorous stirring at room temperature. The mixed solution is kept for 15 min under magnetic stirring while sparging, then heated to 100° C. for 24 hr to form nanocrystals. The obtained nanocrystals are precipitated using ethanol (solution:ethanol=4:1 vol:vol), and centrifuged (4,000 rpm for 5 min), to recover a precipitate. The precipitate is then dried in vacuum at 50° C.

Isolated Cu-doped $Zn_{0.9}Pb_{0.1}S$ nanocrystals are ground to a fine powder using a pestle and mortar. These finely ground nanocrystals (100 mg) are added to a solution containing about 90 wt % 1,2-addition polybutadiene (556 mg), 1,2,4-triethylmercaptan cyclohexane (333 mg), and xylenes (100 mg). This solution is vortex-mixed to homogeneity, then spin-cast at 2000 rpm for 30 seconds on a glass slide. The films are then cured by exposure to an H-bulb with a power of 100 mW/cm$^2$ for 10 seconds.

Figure 8:
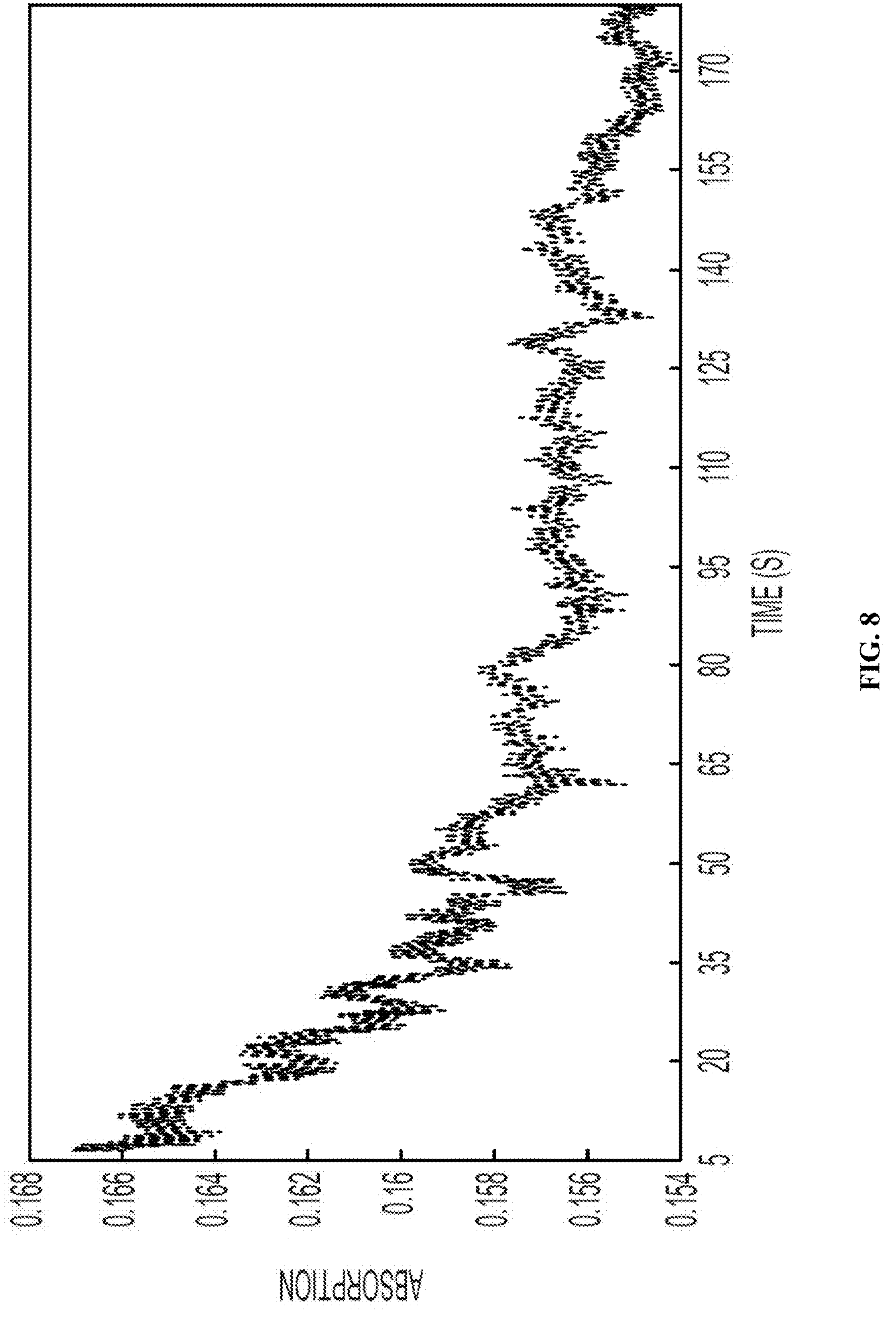
FIG. 8 is a plot of light absorption versus time in Example 4, revealing the detinting of Cu-doped $Zn_{0.9}Pb_{0.1}S$ nanocrystals.

Photodarkening of the Cu-doped $Zn_{0.9}Pb_{0.1}S$ nanocrystals is tested by exposing the nanocrystals to a 365-nm light source for about 10 seconds to initiate photochromism. The 365-nm light source is a UV LED. After exposure to UV light, the Cu-doped $Zn_{0.9}Pb_{0.1}S$ nanocrystals subsequently undergo detinting. This is shown in FIG. 8, which reveals the photodarkening and detinting of cast Cu-doped $Zn_{0.9}Pb_{0.1}S$ nanocrystals with a polymer matrix of polybutadiene and poly(trimethylene carbonate). The plot of FIG. 8 shows light absorption versus time. The y-axis of FIG. 8 is fractional absorption probed at 600 nm (visible light); the maximum absorption of about 0.17 (17%) occurs during the UV pulse, followed by detinting after removal of the UV pulse. The absorption of light is passively reduced after the UV pump is turned off. The relaxation time for detinting in this Example 4 is about 5 seconds or less, which is derived from FIG. 8 at the point corresponding to a derivative of-1%/s.

Example 5: Ligand Exchange of Copper-Doped Zinc Sulfide Nanoparticles

This example tests ligand exchange to add allyl mercaptan or benzyl mercaptan, as organic ligands, onto the Cu-doped ZnS nanocrystals of Example 1. Allyl mercaptan ($C_3H_6S$) contains a C—C bond, and benzyl mercaptan ($C_6H_5CH_2SH$) contains six C═C aromatic bonds.

Ligand exchange of the as-synthesized Cu-doped Zn nanocrystals from Example 1 is performed before the drying step (100° C. for 24 hr). A 0.5 M NaOH aqueous solution (30 mL) is prepared and allowed to react with 11.49 mmol of the target ligand (allyl mercaptan or benzyl mercaptan). After 30 minutes, about 100 mg of an as-synthesized nanocrystal product is added and vortexed to dissolve in solution. This creates a target ligand excess of approximately 10×. The ligand exchange proceeds at room temperature overnight until the exchanged particles precipitate. The product is collected by centrifugation (4,000 rpm for 10 min) and dried in vacuum at 50° C.

The allyl mercaptan or benzyl mercaptan ligands are capable of accepting transfer of photoexcited holes from the Cu-doped ZnS nanocrystals. That is, allyl mercaptan and benzyl mercaptan provide a good hole-trapping function. A comparison is made to an epoxy film, which provides no hole trapping, as a control. A comparison is made also to water (using aqueous ZnS) since water is known to aid in relaxation, although $H_2O$ cannot itself function to trap photoexcited holes.

Photochromism is initiated with a 365-nm UV pulse and is probed by visible-light absorption at 600 nm. The UV pulse generates a plurality of photoexcited holes in the Cu-doped ZnS nanoparticles. The photoexcited holes move into an atomic orbital associated with the copper dopant particles, thereby generating dopant-contained holes. The dopant-contained holes are then trapped in the organic ligands (benzyl mercaptan or allyl mercaptan), thereby reversing the photochromism. The photochromism reversal takes places on a time scale known as the relaxation time.

Figure 9:
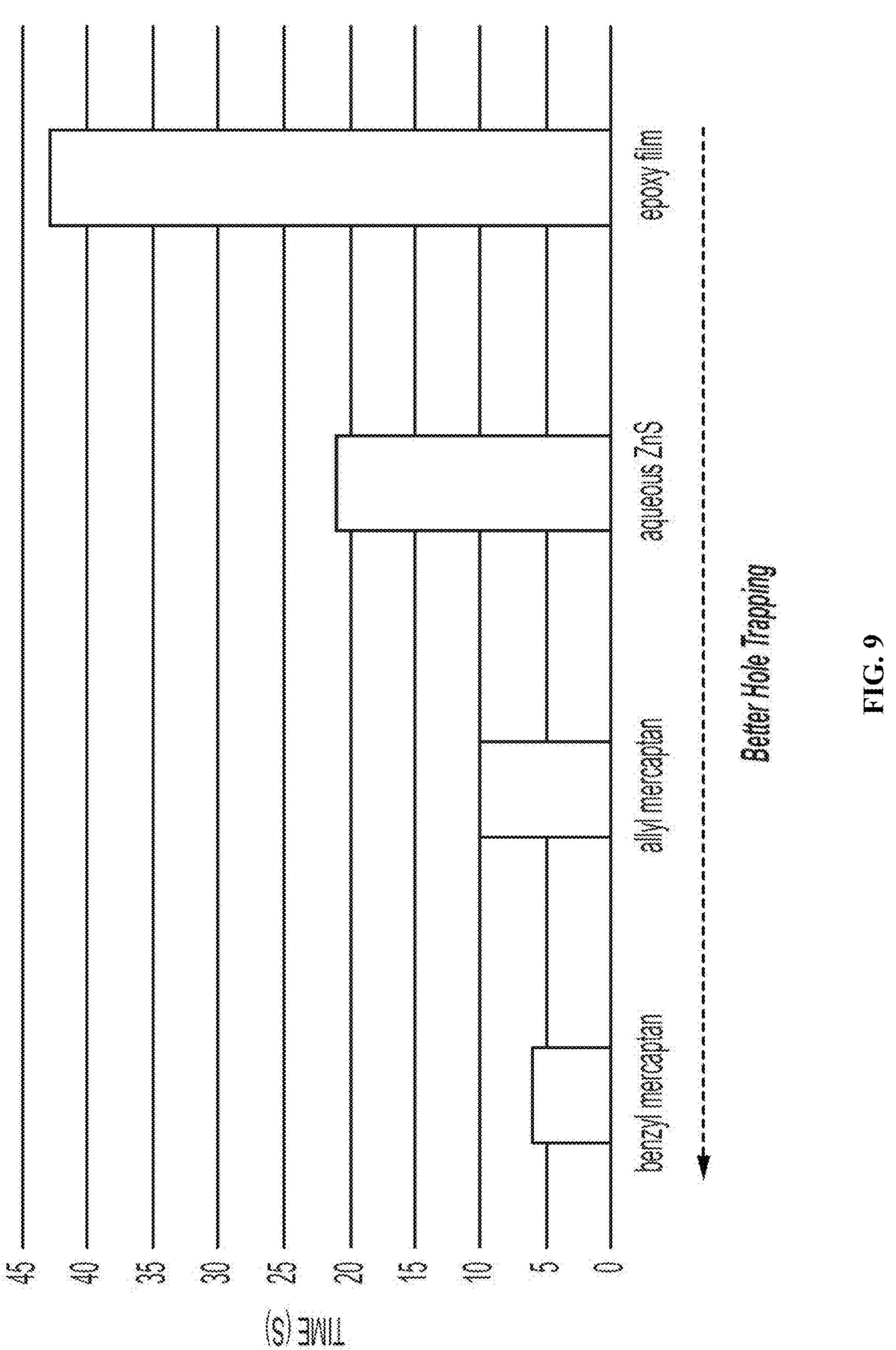
FIG. 9 a graph showing relaxation time for tinting of Cu-doped ZnS nanoparticles with assorted hole traps, in Example 5.

FIG. 9 is a graph showing relaxation time for tinting of Cu-doped ZnS nanoparticles with assorted hole traps (left to right:benzyl mercaptan, allyl mercaptan, water, none). Photochromic reversal time can be controlled with surface ligands as well as with the particles' environment. The relaxation time using water is more than 20 seconds, and the relaxation time using an epoxy film is more than 40 seconds. Better hole-trapping organic ligands result in faster detinting. The best hole-trapping organic ligand in this example is benzyl mercaptan, which enables a relaxation time of about 6 seconds. Allyl mercaptan enables a relaxation time of about 10 seconds. Both benzyl mercaptan and allyl mercaptan, in this Example 5, are superior organic ligands compared to 3-mercaptopropionic acid of Example 1, which showed a relaxation time of about 44 seconds.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A photochromic composition comprising:

(a) semiconductor nanoparticles that have an average nanoparticle effective diameter from about 1 nanometer to about 20 nanometers, wherein said semiconductor nanoparticles do not include ZnS, ZnSe, ZnTe, or ZnInS;

(b) transition-metal dopant particles disposed on surfaces of said semiconductor nanoparticles and/or within said semiconductor nanoparticles, wherein said transition-metal dopant particles are capable of undergoing reversible oxidation and reduction; and (c) organic ligands bonded to said semiconductor nanoparticles, wherein said organic ligands contain a carboxylate functional group, a thiol functional group, an amine functional group, or a combination thereof, wherein said photochromic composition is characterized in that solid-state reversible chromatism takes place on a time scale of about 20 seconds or less.

2. The photochromic composition of claim 1, wherein said semiconductor nanoparticles are selected from the group consisting of single-element nanoparticles, two-element nanoparticles, three-element nanoparticles, four-element nanoparticles, and combinations thereof.

3. The photochromic composition of claim 2, wherein said single-element nanoparticles are selected from the group consisting of Si, Ge, and combinations thereof.

4. The photochromic composition of claim 2, wherein said two-element nanoparticles are selected from the group consisting of CdS, CdSe, CdTe, PbS, PbSe, PbTe, InP, InAs, InSb, GaP, GaAs, $Ag_2S$, $Ag_2Se$, $Ag_2Te$, and combinations thereof.

5. The photochromic composition of claim 2, wherein said three-element nanoparticles are selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, $Ag_{2x}Cd_{1-x}S$, $Ag_{2x}Cd_{1-x}Se$, $Ag_{2x}Cd_{1-x}Te$, $Ag_{2x}Pb_{1-x}S$, $Ag_{2x}Pb_{1-x}Se$, $Ag_{2x}Pb_{1-x}Te$, $Ag_{2x}Sn_{1-x}S$, $Ag_{2x}Sn_{1-x}Se$, $Ag_{2x}Sn_{1-x}Te$, and combinations thereof, wherein $0<x<1$.

6. The photochromic composition of claim 2, wherein said four-element nanoparticles are selected from the group consisting of copper indium gallium selenide, copper zinc tin sulfide, and combinations thereof.

7. The photochromic composition of claim 1, wherein said transition-metal dopant particles contain a transition metal selected from the group consisting of Cu, Fe, Ag, Eu, and combinations thereof.

8. The photochromic composition of claim 1, wherein said organic ligands contain at least one carbon-carbon aromatic bond, at least one carbon-carbon double bond, or at least one carbon-carbon triple bond.

9. The photochromic composition of claim 8, wherein, on average, there are 8 or less carbon atoms between a bond site and the first carbon atom with an aromatic bond, a double bond, or a triple bond in the direction away from said bond site, wherein said bond site is the site at which one of said organic ligands bonds to one of said semiconductor nanoparticles.

10. The photochromic composition of claim 1, wherein said organic ligands contain said carboxylate functional group, and wherein said organic ligands are selected from the group consisting of 4-pentenoate, phenylacetate, 3-phenylpropionate, 4-phenylbutyrate, methacrylate, oleate, and combinations thereof.

11. The photochromic composition of claim 1, wherein said organic ligands contain said thiol functional group, and wherein said organic ligands are selected from the group consisting of 2-propene-1-thiol, benzenethiol, and combinations thereof.

12. The photochromic composition of claim 1, wherein said organic ligands contain said amine functional group, and wherein said organic ligands are selected from the group consisting of porphyrins, aniline, benzylamine, phenethylamine, phenylpropylamine, oleylamine, 2-aminoethanol, 3-aminopropanol, and combinations thereof.

13. A photochromic system with an on/off switch, where said photochromic system comprises:

(i) a photochromic composition comprising: (a) semiconductor nanoparticles that have an average nanoparticle effective diameter from about 1 nanometer to about 20 nanometers, wherein said semiconductor nanoparticles do not include ZnS, ZnSe, ZnTe, or ZnInS; (b) transition-metal dopant particles disposed on surfaces of said semiconductor nanoparticles and/or within said semiconductor nanoparticles, wherein said transition-metal dopant particles are capable of undergoing reversible oxidation and reduction; and (c) organic ligands bonded to said semiconductor nanoparticles, wherein said organic ligands contain a carboxylate functional group, a thiol functional group, an amine functional group, or a combination thereof; and (ii) an on/off switch configured to reversibly activate said photochromic composition, wherein said on/off switch is disposed in electrical or electrochemical communication with said photochromic composition.

14. The photochromic system of claim 13, wherein said on/off switch is configured to apply an electric field to said semiconductor nanoparticles.

15. The photochromic system of claim 14, wherein said electric field is configured to quench emissive electron-hole recombination.

16. The photochromic system of claim 13, wherein said on/off switch is configured to apply an electrochemical potential to said semiconductor nanoparticles.

17. The photochromic system of claim 13, wherein said on/off switch is configured to electrochemically oxidize or reduce said transition-metal dopant particles.

18. The photochromic system of claim 13, wherein said photochromic system is characterized in that solid-state reversible chromatism takes place on a time scale of about 20 seconds or less.

19. The photochromic system of claim 13, wherein said photochromic system is characterized in that when said photochromic system is in the off state, said photochromic system allows greater than 90% transmission of incident visible or infrared light with energy below a bandgap of said semiconductor nanoparticles.

* * * * *